United States Patent
Marathe et al.

(10) Patent No.: US 10,360,149 B2
(45) Date of Patent: Jul. 23, 2019

(54) DATA STRUCTURE STORE IN PERSISTENT MEMORY

(71) Applicant: Oracle International Corporation, Redwood City, CA (US)

(72) Inventors: Virendra J. Marathe, Florence, MA (US); Margo I. Seltzer, Lincoln, MA (US); Steve Byan, Littleton, MA (US); Yihe Huang, Cambridge, MA (US)

(73) Assignee: Oracle International Corporation, Redwood City, CA (US)

( * ) Notice: Subject to any disclaimer, the term of this patent is extended or adjusted under 35 U.S.C. 154(b) by 60 days.

(21) Appl. No.: 15/489,544

(22) Filed: Apr. 17, 2017

(65) Prior Publication Data

US 2018/0260324 A1    Sep. 13, 2018

Related U.S. Application Data

(60) Provisional application No. 62/469,976, filed on Mar. 10, 2017.

(51) Int. Cl.
*G06F 12/0804* (2016.01)

(52) U.S. Cl.
CPC .. *G06F 12/0804* (2013.01); *G06F 2212/1008* (2013.01); *G06F 2212/154* (2013.01); *G06F 2212/608* (2013.01)

(58) Field of Classification Search
CPC ............ G06F 11/1471; G06F 12/0804; G06F 2201/82; G06F 3/0619; G06F 12/0815; G06F 12/0868; G06F 12/0897; G06F 2212/1016; G06F 2212/1032;
(Continued)

(56) References Cited

U.S. PATENT DOCUMENTS 7,577,692 B1    8/2009 Corbett et al.
9,389,787 B2    7/2016 McCarthy et al.
(Continued)

OTHER PUBLICATIONS

"Object Storage APO overview", Retrieved from URL: https://docs.openstack.org/developer/swift/api/object_api_v1_overview.html on Apr. 17, 2017, pp. 1-5.
(Continued)

*Primary Examiner* — Zhuo H Li
(74) *Attorney, Agent, or Firm* — Robert C. Kowert; Meyertons, Hood, Kivlin, Kowert & Goetzel, P.C.

(57) ABSTRACT

A persistent data structure store may include an architecture that utilizes dual representations of data hosted in persistent storage coupled with a faster non-persistent cache residing in volatile memory. The persistent data structure store may maintain, in a non-volatile persistent memory, a byte-addressable persistent copy of a data structure storing multiple data values. The persistent data structure store may also maintain a copy of at least some of the data values in a cache copy of the data structure in a volatile memory. When updating values in the data structure, the targeted data value may be updated in the cache copy of the data structure and a log entry specifying the data update may be added to a cross-referencing data operations log from which the data operation will be subsequently applied to the persistent copy of the data structure.

20 Claims, 9 Drawing Sheets

(58) Field of Classification Search
CPC ............. G06F 2212/202; G06F 3/0688; G06F 2212/1008; G06F 2212/154
See application file for complete search history.

(56) References Cited

U.S. PATENT DOCUMENTS

| | | | |
|---|---|---|---|
| 2014/0195480 A1* | 7/2014 | Talagala | G06F 12/0804 707/610 |
| 2014/0351536 A1 | 11/2014 | Santry | |
| 2015/0089245 A1 | 3/2015 | Altman et al. | |
| 2015/0169226 A1 | 6/2015 | Shen et al. | |
| 2015/0370717 A1 | 12/2015 | Godard et al. | |
| 2016/0034225 A1* | 2/2016 | Yoon | G06F 12/0868 711/102 |
| 2016/0321083 A1 | 11/2016 | Costa et al. | |
| 2016/0371162 A1 | 12/2016 | Booss et al. | |
| 2018/0089074 A1* | 3/2018 | Li | G06F 12/0238 |

OTHER PUBLICATIONS

The SNIA NVM Programming Technical Working Group. "NVM Programming Model (Version 1.0.0 Revision 10)", Working Draft. http://snia.org/sites/default/files/NVMProgrammingModel_v1r10DRAFT.pdf, 2013, pp. 1-85.

Volos, H., et al, "Aerie: flexible file-system interfaces to storage-class memory", In Ninth Eurosys Conference 2014, EuroSys 2014, Amsterdam, The Netherlands, Apr. 13-16, 2014 (2014), pp. 1-14.

Volos, H., et al, "Mnemosyne: lightweight persistent memory", In Proceedings of the 16th International Conference on Architectural Support for Programming Languages and Operating Systems (2011), pp. 91-104.

Wang, P., et al., "An efficient design and implementation of lsm-tree based key-value store on open-channel SSD", In Proceedings of the Ninth European Conference on Computer Systems (2014), pp. 16:1-16:14.

Wang, T., et al, "Scalable logging through emerging non-volatile memory" Proceeding of theVLDB Endowment, vol. 1, No. 10, Sep. 1-5, 2014, pp. 865-876.

Wilcox, M., "DAX: Page cache bypass for filesystems on memory storage", Retrieved from URL: http://lwn.net/Articles/618064/, 2014, pp. 1-4.

Wu, X., et al., "zExpander: A key-value cache with both high performance and fewer misses", In Proceedings of the Eleventh European Conference on Computer Systems (2016), pp. 14:1-14:15.

Xu, J., et al, "Nova: A log-structured file system for hybrid volatile/non-volatile main memories", In Proceedings of the 14th Usenix Conference on File and Storage Technologies (2016), pp. 323-338.

Zhang, K., et al., "Mega-KV: A case for gpus to maximize the throughput of in-memory key-value stores", Proceedings of the VLDB Endowment vol. 8, No. 11 (2015), pp. 1226-1237.

Zhang, Y., et al., "A study of application performance with non-volatile main memory", In IEEE 31st Symposium on Mass Storage Systems and Technologies, MSST 2015, Santa Clara, CA, USA, May 30-Jun. 5, 2015 (2015), pp. 1-10.

3D XPoint Technology Revolutionizes Storage Memory. http://www.intel.com/content/www/us/en/architecture-and-technology/3d-xpoint-technology-animation.html, 2015, pp. 1-5.

Arulraj, J., et al., "Let's talk about storage & recovery methods for non-volatile memory database systems", In Proceedings of the 2015 ACM SIGMOD International Conference on Management of Data, Melbourne, Victoria, Australia, May 31-Jun. 4, 2015 (2015), pp. 707-722.

Bailey, K. A., et al., "Exploring Storage Class Memory with Key Value Stores", In Proceedings of 1st Workshop on Interactions of NVM-Flash with Operating Systems and Workloads (2013), pp. 1-8.

Based Pointers, Retrieved from URL: https://msdn.microsoft.com/enus/library/57a97k4e.aspx on Apr. 17, 2017, pp. 1-2.

Berger, E D., et al., "Hoard: A scalable memory allocator for multithreaded applications", In Proceedings of the Ninth International Conference on Architectural Support for Programming Languages and Operating Systems (New York, NY, USA, 2000), ASPLOS IX, ACM, pp. 117-128.

Blott, M., et al., "Achieving 10gbps line-rate key-value stores with FPGAs". In 5th USENIX Workshop on Hot Topics in Cloud Computing (2013), pp. 1-6.

Bridge, B., "Nvm-direct library", Retrieved from URL: https://github.com/oracle/nvm-direct, 2015, pp. 2-6.

Chakrabarti, D. R., et al., "Atlas: leveraging locks for non-volatile memory consistency", In Proceedings of the 2014 ACM International Conference on Object Oriented Programming Systems Languages & Applications, OOPSLA 2014, part of SPLASH 2014, Portland, OR, USA, Oct. 20-24, 2014 (2014), pp. 433-452.

Chang, F., Dean, et al., "Bigtable: A distributed storage system for structured data", ACM Transactions on Computer Systems 26, 2 (Jun. 2008), pp. 4:1-4:26.

Coburn, J., et al, "NVHeaps: Making Persistent Objects Fast and Safe with Nextgeneration, Non-volatile Memories", In Proceedings of the Sixteenth International Conference on Architectural Support for Programming Languages and Operating Systems (2011), pp. 105-118.

Condit, J., et al., "Better i/o through byte-addressable, persistent memory", In Proceedings of the ACM SIGOPS 22nd Symposium on Operating Systems Principles (2009), pp. 133-146.

Sorbet, J., "Supporting filesystems in persistent memory", Retrieved from URL: https://lwn.net/articles/610174/, 2014, pp. 1-11.

Decandia, G., et al., "Dynamo: amazon's highly available key-value store", In Proceedings of the 21st ACM Symposium on Operating Systems Principles 2007 (2007), pp. 205-220.

Dragojevi'c, A., et al., "Farm: Fast remote memory", In Proceedings of the 11th USENIX Conference on Networked Systems Design and Implementation (2014), pp. 401-414.

Fan, B., et al., "Memc3: Compact and concurrent memcache with dumber caching and smarter hashing", In Proceedings of the 10th USENIX Conference on Networked Systems Design and Implementation (2013), pp. 371-384.

Giles, E., et al., "Softwrap: A lightweight framework for transactional support of storage class memory", In IEEE 31st Symposium on Mass Storage Systems and Technologies, MSST 2015, Santa Clara, CA, USA, May 30-Jun. 5, 2015 (2015), pp. 1-14.

Goel, A., et al., "Fast database restarts at facebook". In Proceedings of the 2014 ACM SIGMOD International Conference on Management of Data (2014), SIGMOD '14, pp. 541-549.

Apache HBase, "Welcome to Apache HBase", Retrieived from URL: http://hbase.apache.org/ on Apr. 17, 2017, pp. 1-3.

Herlihy, M., et al, "Software transactional memory for dynamic-sized data structures", In Proceedings of the Twenty-second Annual Symposium on Principles of Distributed Computing (2003), pp. 92-101.

Hetherington, T. H., et al., "Memcachedgpu: Scaling-up scale-out key-value stores", In Proceedings of the Sixth ACM Symposium on Cloud Computing (2015), pp. 43-57.

Hosomi, M., et al., "A novel nonvolatile memory with spin torque transfer magnetization switching: Spin-RAM", International Electron Devices Meeting (2005), pp. 459-462.

Huai, Y. Spin-Transfer TorqueMRAM(STT-MRAM): Challenges and Prospects. AAPPS Bulletin 18,6 (2008), 33-40.

"Intel R 64 and IA-32 Architectures Software Developer's Manual", Retrieved from URL: http://www.intel.com/content/dam/www/public/us/en/documents/manuals/64-ia-32-architectures-software-developer-manual-325462.pdf, 2015, vol. 2, Chapter 3, pp. 3-139 thru 3-142 & 3-146-thru 3-147.

"Intel R Architecture Instruction Set Extensions Programming Reference", Retrievied from URL: https://software.intel.com/sites/default/files/managed/0d/53/319433-022.pdf, 2016, pp. 1-141.

Intel, "NVDIMM Block Window Driver Writer's Guide", Retrieved from URL: hftp://pmem.io/documents/NVDIMM_DriverWritersGuide-July-2016.pdf, 2016, pp. 1-38.

Johnson, R., et al., "Aether: A Scalable Approach to Logging", Proceedings of VLDB Endowment 3, 1-2 (Sep. 2010), pp. 681-692.

(56) References Cited

OTHER PUBLICATIONS

Johnson, R., et al., "Scalability of Write-ahead Logging on Multicore and Multisocket Hardware". THE VLDB Journal 21, 2 (Apr. 2012), pp. 239-263.
Joshi, A., et al., "Efficient persist barriers for multicores", In Proceedings of the 48th International Symposium on Microarchitecture (2015), MICRO-48, pp. 660-671.
Kalia, A., et al., "Using RDMA efficiently for key-value services", In Proceedings of the 2014 ACM Conference on SIGCOMM (2014), pp. 295-306.
Kallman, R., et al, "H-store: a high-performance, distributed main memory transaction processing system", PVLDB 1, 2 (2008), pp. 1496-1499.
Kolli, A., et al., "High-Performance Transactions for Persistent Memories". In 21th ACM International Conference on Architectural Support for Programming Languages and Operating Systems (2016), pp. 1-13.
Lakshman, A., et al., "Cassandra: A Decentralized Structured Storage System". SIGOPS Operating Systems Review 44, 2 (2010), pp. 35-40.
Lamport, L. "Time, Clocks, and the Ordering of Events in a Distributed System", Communications of the ACM 21, 7 (Jul. 1978), pp. 558-565.
"LevelDB", Retrieved from URL: https://github.com/Level/levelup/blob/master/README.md on Apr. 17, 2017, pp. 1-22.
Li, S. et al., "Architecting to achieve a billion requests per second throughput on a single key-value store server platform", In Proceedings of the 42Nd Annual International Symposium on Computer Architecture (2015), pp. 476-488.
Lim, H., et al., "Mica: A holistic approach to fast in-memory key-value storage", In Proceedings of the 11th USENIX Conference on Networked Systems Design and Implementation (2014), pp. 429-444.
Lim, K., et al, "Thin servers with smart pipes: Designing soc accelerators for memcached", In Proceedings of the 40th Annual International Symposium on Computer Architecture (2013), pp. 36-47.
Mao, Y., et al., "Cache craftiness for fast multicore key-value storage", In Proceedings of the 7th ACM European Conference on Computer Systems (2012), pp. 183-196.
"Memcached", Retrieved from https://github.com/memcached/memcached/wiki/Overview on Apr. 17, 2017, pp. 1-4.
Mitchell, C., et al., "Using one-sided rdma reads to build a fast, cpu-efficient key-value store", In Proceedings of the 2013 USENIX Conference on Annual Technical Conference (2013), pp. 103-114.
Mohan, C., et al., "ARIES: A transaction recovery method supporting fine-granularity locking and partial rollbacks using write-ahead logging", ACM Transactions on Database Systems 17, 1 (1992), pp. 94-162.
Pelley, S., et al., "Memory persistency", In ACM/IEEE 41st International Symposium on Computer Architecture, ISCA 2014, Minneapolis, MN, USA, Jun. 14-18, 2014 (2014), pp. 265-276.
Persistent Memory Programming (pmem.io), "Using the Block Translation Table for Sector Atomicity", Retrieved from URL: http://pmem.io/2014/09/23/btt.html, 2014, pp. 1-6.
Subramanya R. Dullor, et al., "System software for persistent memory", In Ninth Eurosys Conference 2014, EuroSys 2014, Amsterdam, The Netherlands, Apr. 13-16, 2014 (2014), pp. 1-15.
"An introduction to Redis data types and abstractions", Retrieved from URL: https://redis.io/topics/data-types-intro on Apr. 17, 2017, pp. 1-26.
Rudoff, A. "Deprecating the PCOMMIT Instruction". Retrieved from URL: https://software.intel.com/en-us/blogs/2016/09/12/deprecatepcommit-instruction, 2016, pp. 1-5.
Stonebraker, M., et al., "The Voltdb Main Memory DBMS", IEEE Data Eng. Bull. 36, 2 (2013), pp. 21-27.
Strukov, D. B., et al., "The missing Memristor found" Nature vol. 453, May 2008, pp. 80-83.
Suzuki, K, et al., "A Survey of Trends in Non-Volatile Memory Technologies: 2000-2014", In 2015 IEEE International Memory Workshop (2015), pp. 1-4.

\* cited by examiner

DATA STRUCTURE STORE IN PERSISTENT MEMORY

This application claims benefit of priority of U.S. Provisional Application Ser. No. 62/469,976 titled "Data Structure Store in Persistent Memory" filed Mar. 10, 2017, the content of which is incorporated by reference herein in its entirety.

BACKGROUND

Field of the Disclosure

This disclosure relates generally to persistent data stores and more specifically to data stores using byte-addressable persistent memory technologies.

Description of the Related Art

Data stores, such as key-value stores with simple GET/PUT based interfaces, have become an integral part of modern data center infrastructures. Many of these works present the data store as a volatile cache for a backend database. However, even if the data store is persistent, systems are traditionally designed to utilize slow, block-based storage mediums and marshal updates, such as via a file system interface, into a different data representation (e.g., block-based representation). In many cases, warming up the DRAM cache can take up a long time (e.g., several hours) in workloads with large data sets.

Traditional key-value stores typically structured for "single-point" query operations such as GET and PUT and are frequently architected either as standalone databases or as caches layered on top of larger backend databases. One of the attributes of these systems may be low latency, which is why a hash table based "backbone structure" may be preferred in some implementations. Such a hash table may thus incur amortized constant time lookup overheads.

In some embodiments, key-value stores may include a rich set of subsystems designed to improve overall performance. For example, a key-value stores may employ one or more cache management algorithms (e.g. different variants of the LRU scheme). Many of key-value stores perform their own memory management instead of relying on a system's memory management libraries. Additionally, RDMA-based networking substrates may boost performance and GPUs and/or other hardware features may be utilized to scale key-value stores.

Key-value stores may also provide persistence capabilities. For example, a key-value store may optimize the storage tier using algorithms such as log-structured merge trees (LSM-trees) that may be considered effective on slow, block-based storage media. This is understandable since traditionally the storage stack has been exclusively dominated by block-based storage technologies (e.g., spinning media, NAND flash, etc.) that may be orders of magnitude slower than DRAM. However, in some embodiments, byte-addressable persistent memory technologies may be utilized to improve for key-value store implementations, as described herein.

While key-value stores generally assume a simple string or block based structure of keys and values, in some embodiments, values may be instances of richer data types such as sets, lists, publish/subscribe pools, maps, hyperloglogs, etc. The diversity in the structures of these value types may naturally align them to persistent (e.g., non-volatile) memory centric implementations.

Figure 1:
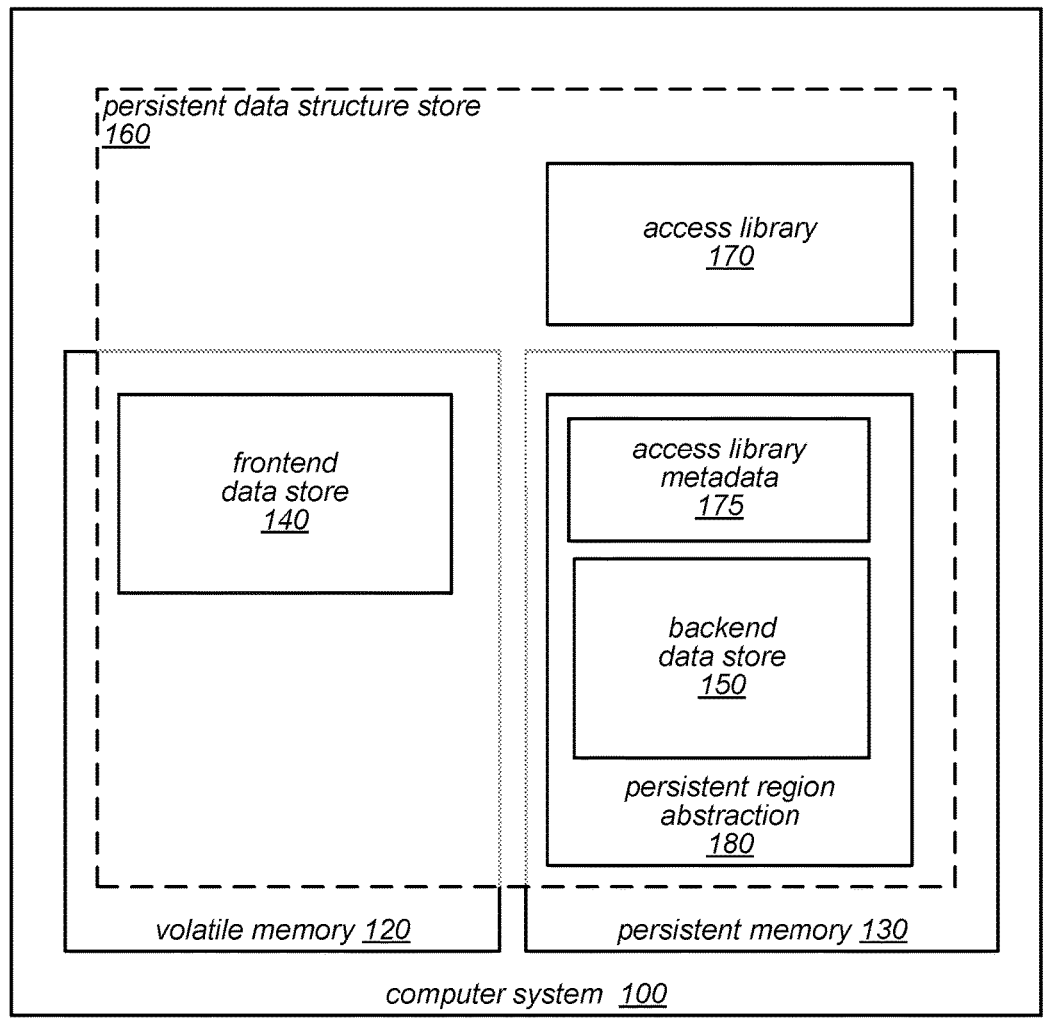
FIG. 1 is a logical block diagram illustrating a system configured to implement and/or utilize a Data Structure Store in Persistent Memory, as described herein according to one embodiment.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

SUMMARY

Described herein are systems, mechanisms, methods and techniques for a new persistent data structure store leveraging and/or utilizing byte-addressable persistent memory, according to various embodiments. A persistent data structure store may be configured to maintain, in non-volatile persistent memory, an in-memory, byte-addressable, persistent copy of a data structure configured to store data values. The persistent data structure store may also contain a copy of at least some of the data values in a cache copy of the data structure in volatile memory. In some embodiments, the cache copy of the data structure may be structurally identical, or at least structurally similar, to the persistent copy.

When processing client data requests, the persistent data structure store may first attempt to complete the request using the cache copy of the data structure. For example, when servicing a client data read request, the persistent data structure store may first attempt to read the targeted data value from the cache copy in volatile memory, but in response to determining that the targeted data value is not present in the cache copy, the persistent data structure may add the data value to the cache copy from the persistent copy of the data structure. Similarly, when servicing a client data update request, the persistent data structure store may first update the targeted data value in the cache copy of the data structure, adding the data value to the cache copy if it is not already present. The persistent data structure store may then add a log entry to a data operations log so that the data operation (e.g., the data value update) may be applied to the persistent copy of the data structure in non-volatile memory.

The data operations log may be maintained in non-volatile memory, so that it will be available after a restart for example. The persistent data structure store may be configured to utilize multiple threads to add data operations to the data operations log as well as to apply the logged data operations to the persistent copy of the data structure. For example, in one embodiment, frontend threads may append data update operations to the operations log while backend threads may remove log entries and apply the logged data operations to the persistent copy of the data structure. After a system restart (e.g., due to a failure or controlled showdown) any logged data operations that were not applied prior to the restart may be applied.

DETAILED DESCRIPTION OF EMBODIMENTS

Introduction

Data stores, such as key-value stores with simple GET/PUT based interfaces, have become an integral part of modern data center infrastructures. However, many of these works present the data store as a volatile cache for a backend database. Even if the data store persistent, systems are traditionally designed to utilize slow, block-based storage mediums and marshal updates, such as via a file system interface, into a different data representation (e.g., block-based representation). In many cases, warming up the DRAM cache can take up a long time (e.g., several hours) in workloads with large data sets.

At the same time, byte-addressable persistent (e.g., non-volatile) memory technologies, such as spin-transfer torque MRAM (STT-MRAM), memristors, are becoming more available, as evidenced for example by Intel and Micron Technologies' recent announcement of their 3D XPoint persistent memory. These technologies may offer the persistence of traditional storage media (SSDs, HDDs) with the byte addressability and performance of DRAM (up to 100-1000× faster than state-of-the-art NAND flash). Byte addressability may enable access to persistent data via load/store instructions rather than through a traditional file system interface. As a result, these technologies may possess the potential to change how persistent data is managed and the design of key-value store architectures.

Described herein are embodiments of various systems, methods, and techniques for implementing a persistent data structure store, such as a key-value store, that may be configured to utilize persistent memory technologies. For example, the system may utilize byte addressable persistent data structures (e.g., equivalent to an in-memory representation), such as to reduce warmup time during startup or restart. However, in some embodiments, this may entail higher critical path overheads related to higher access latencies of some persistent memory technologies that may be somewhat slower than DRAM. Furthermore, infrastructure support may provide and/or guarantee failure atomicity semantics of update requests, but may also add significant overhead to critical path latencies, in some embodiments. Thus, in some embodiments, a persistent data structure store may limit warmup time during startup (e.g., during restart after failure or shutdown). A persistent data structure store, as described herein, may be considered to achieve two primary goals/functions: (i) nearly instantaneous "warmup" after a failure or a controlled shutdown, and (ii) reduced overheads on the critical path of client requests, such as update requests.

In some embodiments, a persistent data structure store may utilize the dual representation of data, one with a fast (e.g., DRAM-resident) non-persistent cache and the other with a byte addressable persistent data representation (i.e., possibly enabling fine grain data access with high degree of parallelism). FIG. 1 is a logical block diagram illustrating one example system configured to implement a persistent data structure store, as described herein. As illustrated FIG. 1, a computer system 100, which in some embodiments may represent a multicore cache coherent computer system, may include both a volatile memory 120 and a persistent memory 130. Computer system 100 may be configured to implement a persistent data structure store 160 that may include (or maintain) both a frontend data store 140, which may represent a volatile cache copy of a data structure, in volatile memory 120 and a backend data store 150, which may represent a persistent copy of the data structure, in persistent memory 130.

In some embodiments, a system implementing a persistent data structure store 160, as described herein, may include a persistent memory access library 170 configured to provide support for lower level programming abstractions allowing program applications directly to persistent memory. Access library 170 may be configured to include, access, maintain and/or otherwise utilize access library metadata 175. Access library metadata 175 may be, or may include, state information regarding access library 170 and/or persistent data structure store 160, such as state information regarding persistent transactions and/or state information regarding memory allocator(s). Additionally, access library 170 may also access, interact with, or include, a persistent region abstraction 180, as will be described in more detail subsequently.

The design of the system's architecture may, in some embodiments, be considered to result in both reduced warmup time and reduced overhead on critical paths. In some embodiments, a system configured to implement a persistent data structure store may employ two strategies. For instance, in some embodiments, the system may maintain an in-memory, byte-addressable, persistent copy of the system's data structures, such as backend data store 150. Maintaining an in-memory, byte-addressable, persistent copy of the system's data structures may permit direct access of individual key-value pairs as if the data structures were hosted in DRAM in some embodiments. Additionally, the system may maintain a cached copy of the data structures, such as in frontend data store 140 in volatile memory 120, which may exhibit faster memory access times that the persistent memory 130. Use of a cached copy of the data structures in volatile memory may, in some embodiments, support low latency lookups. In some embodiments, the cached copy of the data structures may be structurally similar (e.g., identical or almost identical in some cases) to the persistent data structures. Thus, a miss in the cache copy may be fulfilled from the persistent copy utilizing similar (or identical) code to parse and/or read the data structure(s).

In some embodiments, the gap between the persistent and cached copies of the data structure may be bridged by employing data operations logs, such as one or more cross-referencing logs described herein. In general, a cross-referencing log may be considered an efficient, concurrent logging scheme configured to track ordering dependencies between log records using cross-log links (e.g., instead of more complex central synchronization clocks). Cross-referencing logs may allow client request processing code paths to remain simple and efficient, according to some embodiments.

Backend threads may apply (possibly asynchronously) persisted log records to the persistent copy of the system's value type instances. An epoch based scheme may be used to apply log records to the backend persistent data structures in batches. The epoch based scheme may also be used for log space reclamation in some embodiments. The backend threads may use the cross-referencing logs' structure to apply the persisted log records to the backend persistent data structures in the correct order (e.g., chronologically in the order that the log entries were added to the log). In some embodiments, one or more of the system's value type instances may provide non-idempotent operations (e.g. push/pop from a linked list value type) where repeated application of the same operation may result in incorrect program behavior. To correctly handle non-idempotent operations, the system may, in some embodiments, use a backend runtime system that supports a failure atomic transaction abstraction. When executed by the backend threads, the resulting code path may be off the critical path of client request processing (unlike the simpler approach puts expensive failure-atomic transactional operations on the critical path of all operations), according to some embodiments.

The persistent data structure store system may be described herein in terms of features, methods, techniques, and/or systems implemented using single-node multicore systems, such as illustrated in FIG. 1. In some embodiments, the system may not include a distributed key-value store, and may not rely on high performance network substrates (e.g., RDMA), or other hardware features (e.g. GPUs) to boost performance. However, the features, methods, techniques, and/or systems described herein may be compatible, usable and/or may otherwise utilize such extensions (e.g., distributed key-value stores, RDMA network substrates, GPUs, and/or other hardware features) to boost performance, according to some embodiments.

System Support for Persistent Memory

Figure 2:
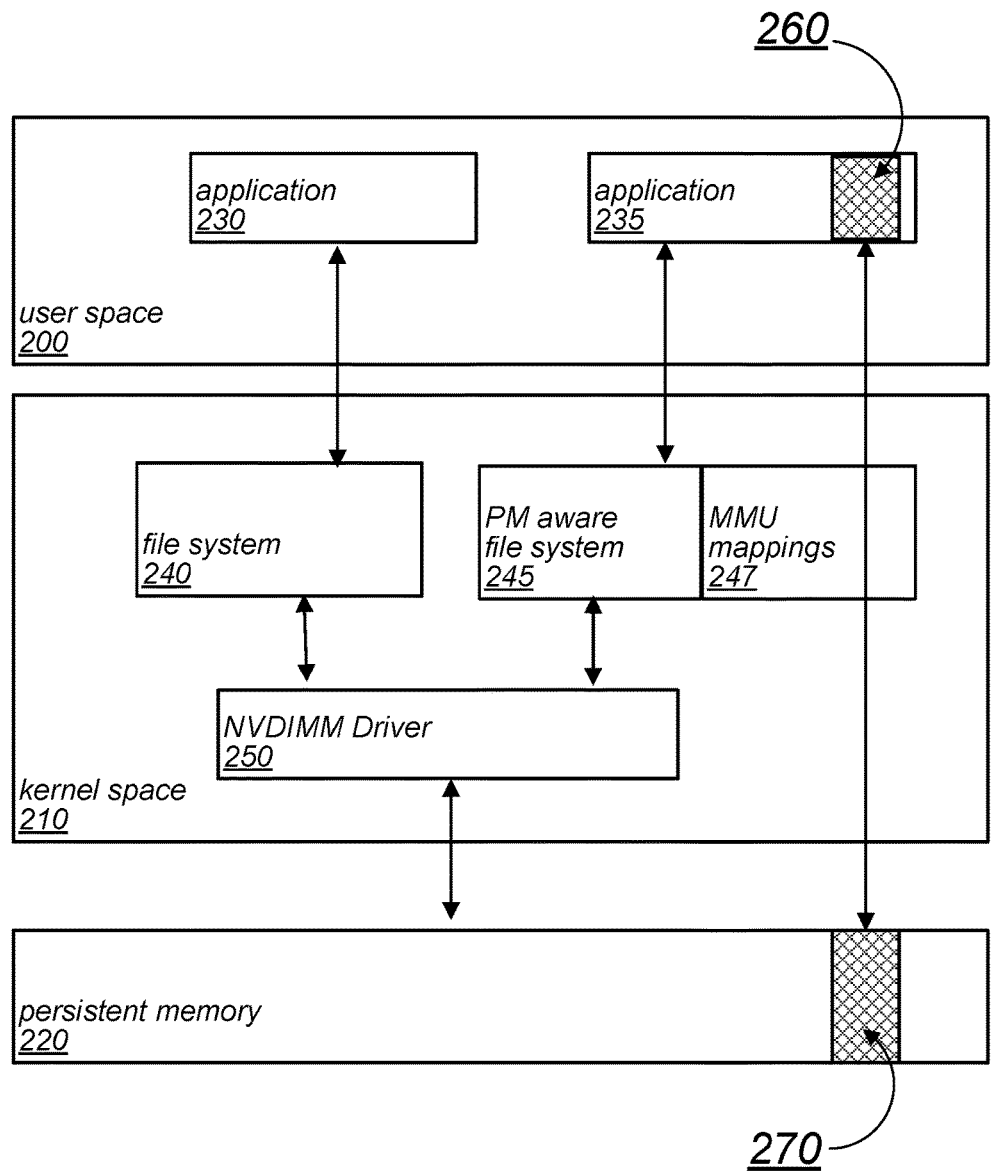
FIG. 2 is a logical block diagram illustrating an example lower level software stack for persistent memory, according to one embodiment.

FIG. 2 illustrates an example lower level software stack for persistent (e.g., non-volatile) memory 220, according to one example embodiment. A system may include a persistent memory 200, such as a persistent memory DIMM, available to drivers and/or systems executing in a kernel space 210 that in turn present interfaces allowing applications, such as application 230 and application 235, executing in user space 200 to access data in the persistent memory 220. Thus in some cases, persistent memory DIMMs (e.g., Intel and Micron's 3D) XPoint technology) may share space with DRAM DIMMs, such as in enterprise systems. Performance of these technologies may approach that of DRAM, while technologies such as STT-MRAM may even exceed DRAM performance. These DIMMs may become available to applications via various pathways depicted in FIG. 2. For example, applications using data stores, such as a key-value store, may use an mmap-based interface to enable direct load/store access to persistent data hosted in the mmapped files, according to some embodiments.

In some embodiments, a persistent memory driver, such as NVDIMM Driver 250, may present a persistent memory 220 as a traditional block based device, in which case, traditional file systems, such as file system 240, may use the memory directly as block storage devices. File system 240 may, in turn, provide a file system interface to applications, such as application 230, in user space 200.

Additionally, persistent memory (PM) aware file systems, such as PM aware file system 245, may provide a different interface (e.g., such as a POSIX interface) to files hosted on persistent memory 220, and may provide the capability to directly map persistent memory pages in application address spaces, according to some embodiments. For instance, in one embodiment, PM aware file system 245 may be configured to map, via MMU mappings 247, a persistent memory page 270 to page 260 in application 235 within user space 200. Note that in some embodiments, the load/store based interface may not be all that is needed to correctly access and modify data hosted in persistent memory pages mapped into an application's address space. For instance, in some systems completion of a store instruction may not guarantee that the store has persisted. Additionally, processor state and various layers of the memory hierarchy (store buffers, caches) may be expected to remain nonpersistent for the foreseeable future.

In some systems, new hardware instructions have been proposed to flush and/or write cache lines back to lower layers in the memory hierarchy, and new forms of persist barrier instructions have been proposed to order persistence of stores. To correctly update and persist data hosted in persistent (e.g., non-volatile) memory, applications may need to issue cache line flushes/write backs (e.g. clflushopt/clwb instructions on Intel processors) and persist barriers in the correct order, such as the sfence instruction on some processors as one example. For instance, a particular type of pcommit instruction may be used to persist (e.g., flush to persistent memory) updates that reach the on-chip memory before pcommit gets serialized using an sfence instruction. However, the pcommit instruction may be deprecated one some system, such as due to the potential for systems to include Asynchronous DRAM Refresh (ADR) capabilities that flush on-chip memory controller buffers to memory DIMMs on power failure events. As a result, any updates directed to persistent memory that reach memory controller buffers may become effectively persistent in some embodiments.

However, even with such new instructions, correctly writing programs to use effectively may remain a daunting task. The programmer may need to carefully determine the order in which updates to various pieces of the application's persistent data structures are persisted since, in some cases, omission of even a single flush, write back, or persist barrier instruction may result in persistent data inconsistencies in the face of failures. In some embodiments, the key-value stores system described herein may leverage byte-addressability of persistent memory by using lower level programming abstractions to access and manipulate data on persistent memory.

Architectural Overview

One example technique for a utilizing direct byte-addressable access to persistent memory may be to adopt a key-value store architecture that hosts just one backbone structure (e.g. hash table, B-tree, etc.) in persistent memory, such as with GET/PUT accessors directly accessing that structure. This approach may remove the need for maintaining two different data representations (e.g., a marshalled one for storage, and a byte-addressable version for faster lookups), thus potentially reducing the space, as well as code path overhead, required to maintain the two data representations.

However, in some embodiments, a key-value store architecture hosting a single backbone structure in persistent memory may incur (or involve) two significant drawbacks. First, persistent memory technologies (such as 3D XPoint™ for example) may be slower (e.g., due to higher latency and/or lower bandwidth) than non-persistent memory. As a result, accesses to data hosted in persistent memory may be slower than accesses to the same data hosted in volatile memory (e.g., DRAM). Second, failure-atomicity guarantees for persistent data structure updates may be considered fundamental for a correct implementation of a key-value store utilizing persistent memory technologies. For example, transactional, copy-on-write, or similar techniques, may be necessary to implement failure atomicity, but may incur non-trivial overheads. Furthermore, a single instance of an operation, such as a PUT operation, may lead to multiple updates to persistent data structures, all of which may need to be applied in a failure atomic manner, thus potentially leading to "write amplification" on the critical path.

As noted above, the traditional dual data representation approach (e.g., where a marshalled copy of the data hosted in the slow storage medium is bridged to a cached copy hosted in DRAM by a simple persistent write-ahead log whose records may include <opcode-payload>tuples) typically involves long warmup times (e.g., after shutdown and/or failure). For instance, when using a traditional dual data representation approach, the persistent key-value store data may need to be transformed into a DRAM "friendly" data representation and loaded in DRAM before the key-value store can be used (e.g., before the system can begin serving client requests). The time of a traditional warmup may be linearly proportional to the key-value store's size.

A persistent data structure store described herein may, in some embodiments, be configured to utilize a "middle ground" approach leveraging a byte-addressable representation of the persistent copy of the data structures, while utilizing low latency critical path operations applied using a cached copy of the system's data structures in volatile memory (e.g., DRAM) augmented with a parallel logging system optimized for persistent memory. Thus, in some embodiments, a persistent data structure store may deliver faster (e.g., near instantaneous) warmup times that traditional approaches.

Example embodiments of a persistent data structure store, and/or a system architecture thereof, may be described herein in terms of multicore cache coherent systems using a shared system design. For example, in the example embodiments described herein data may be accessible to all threads and may not be partitioned between threads, such as to avoid synchronization overheads. In some embodiments, the shared approach may be used as it may automatically manage load balancing issues (e.g., such as may occur in partitioned designs). Additionally, in other embodiments, a partitioned variant of the system may be implemented, as discussed subsequently. While described herein mainly in terms of multicore cache coherent systems using a shared system design, the features, functions, methods and or mechanisms described herein may also apply to other types of system, according to various embodiments.

Figure 3:
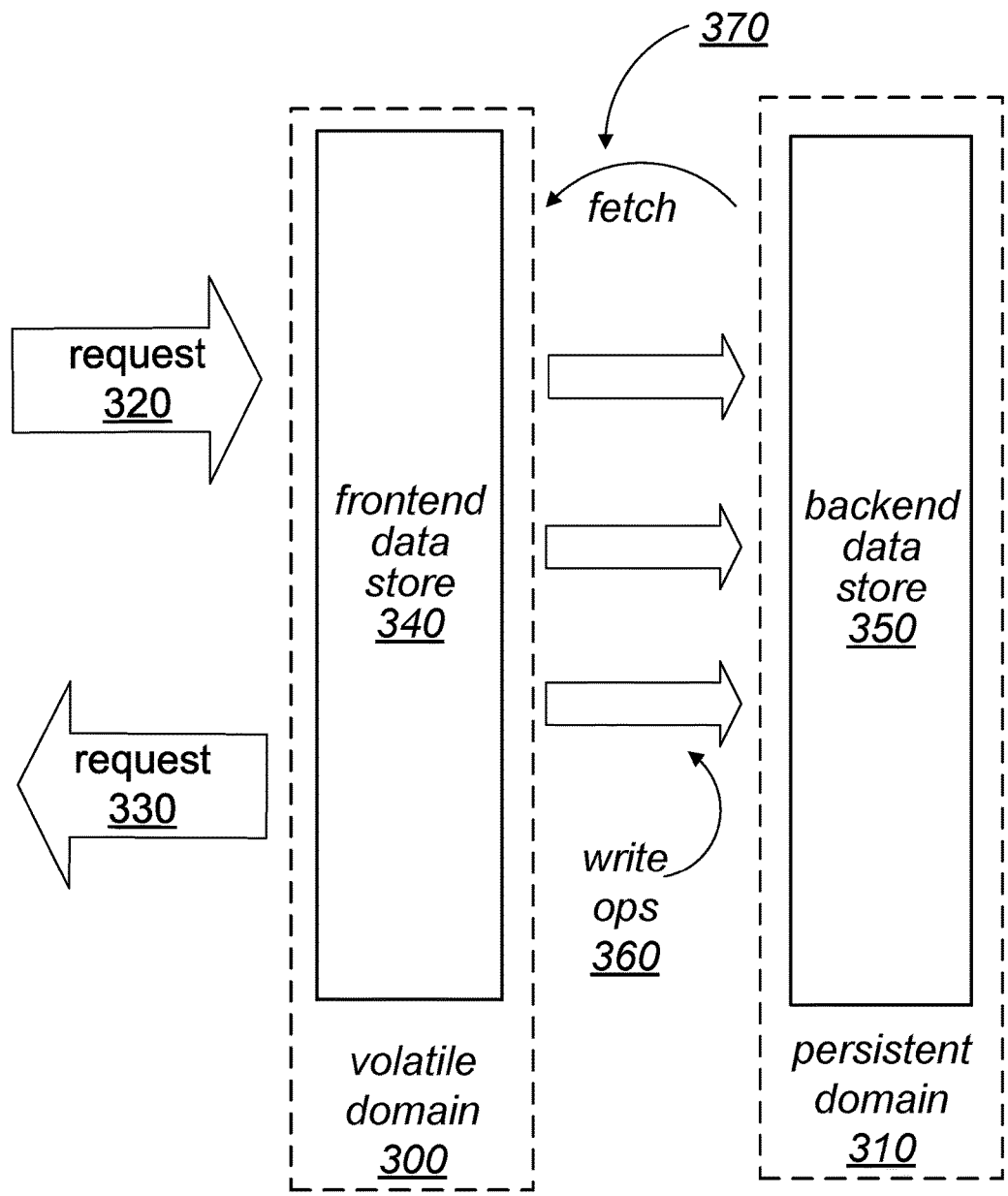
FIG. 3 is a block diagram illustrating an example architectural overview of a persistent data structure store system, according to one embodiment.

FIG. 3 depicts a high-level architecture of one example embodiment of persistent data structure store. The design may be separated into a frontend data store 340 and a backend data store 350, both of which may represent key-value (K-V) stores in some embodiments. The frontend data store 340 and the backend data store 350 may reside in the same address space, according to some embodiments. The frontend K-V store may represent a cache copy of a system's data structure(s) residing in volatile domain 300, which may represent non-persistent (e.g., volatile) memory. The persistent data structures of the backend data store 350 may reside in persistent domain 310, which may represent persistent memory. Thus, in some embodiments frontend data store 340 may be hosted entirely in DRAM or other volatile memory and may serve as a cache (e.g., may be a cached copy) for the backend data store 350.

Additionally, in some embodiments, frontend data store 340 may include a configurable number of threads that process incoming requests 320—applying them to the frontend data store's data structures. Thus, a requested data operation may be applied to the cache copy of the persistent data structure. Frontend threads may additionally pass update requests, such as write ops 360, to the backend data store 350. For example, in one embodiment, a frontend data store may append update requests to a local persistent log, at which point the updates may be assumed to be completed. The backend data store 350 may include a configurable number of consumer threads that may periodically read requests from the persistent data operation logs (e.g., the logs updated by the frontend data store's threads) and apply them in the correct order, in a failure-atomic way, to the backend's persistent data structures. While the persistent data structures (e.g., of the backend data store 350) may reside in the persistent domain 310 (e.g., in persistent memory), the backend threads of the backend data store may not reside in persistent memory.

Figure 4:
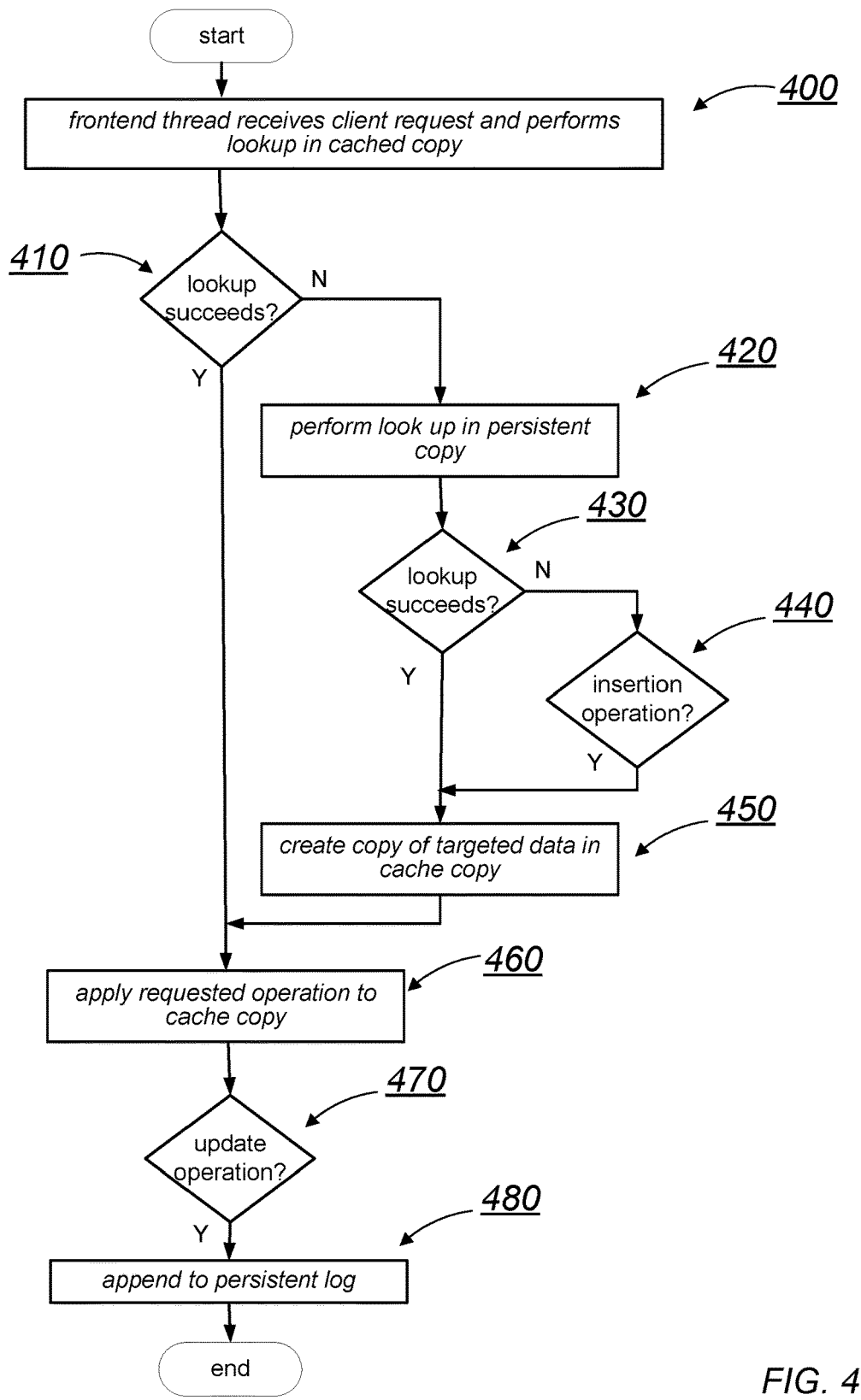
FIG. 4 is a flowchart illustrating one embodiment of a method for processing client requests in a system implementing a persistent data structure store.

FIG. 4 illustrates a flowchart illustrating one embodiment of a method for processing a client request, as described herein. During execution, a frontend thread may receive a client request and may look up the target key of a client request in the cached copy of the data structure (e.g., the frontend data store), as shown in block 400. If the lookup succeeds, as illustrated by the positive output from decision block 410, the operation may then be applied to the cached copy of the data structure (e.g., the frontend data store), as in block 460. Further, if the operation is an update, as indicated by the positive output of decision block 470, the thread may also append a log entry specifying the data operation to the persistent data operations logs, as in block 480. For example, in one example, embodiment, an <opcode-payload> tuple representing the requested data operation may be included in a log entry and appended to the persistent data operations log.

However, if the frontend thread fails to successfully lookup the target key in the cached copy of the data structure (e.g., the frontend data store), as indicated by the negative output of decision block 410, the frontend thread may perform a lookup in the persistent copy of the data structure (e.g., backend data store) as in block 420. If the lookup in the persistent copy of the data structure succeeds, as indicated by the positive output of decision block 430, a copy of the targeted data (e.g., the data specified in the client request) may be created in the cached copy of the data structure (e.g., the frontend data store) as in block 450, and the operation may then proceed as if the original lookup in the cache copy of the data structure had succeeded. Conversely, if the lookup in the persistent copy of the data structure (e.g., the backend data store) fails, the operation may still proceed if the operation is an insertion. thus, if the requested operation is an insertion operation, as indicated by the positive output of decision block 440, a copy of the targeted data may be created in the cached copy of the data structure as in block 450 and the operation may then proceed as if the original lookup in the cache copy of the data structure had succeeded.

Figure 5:
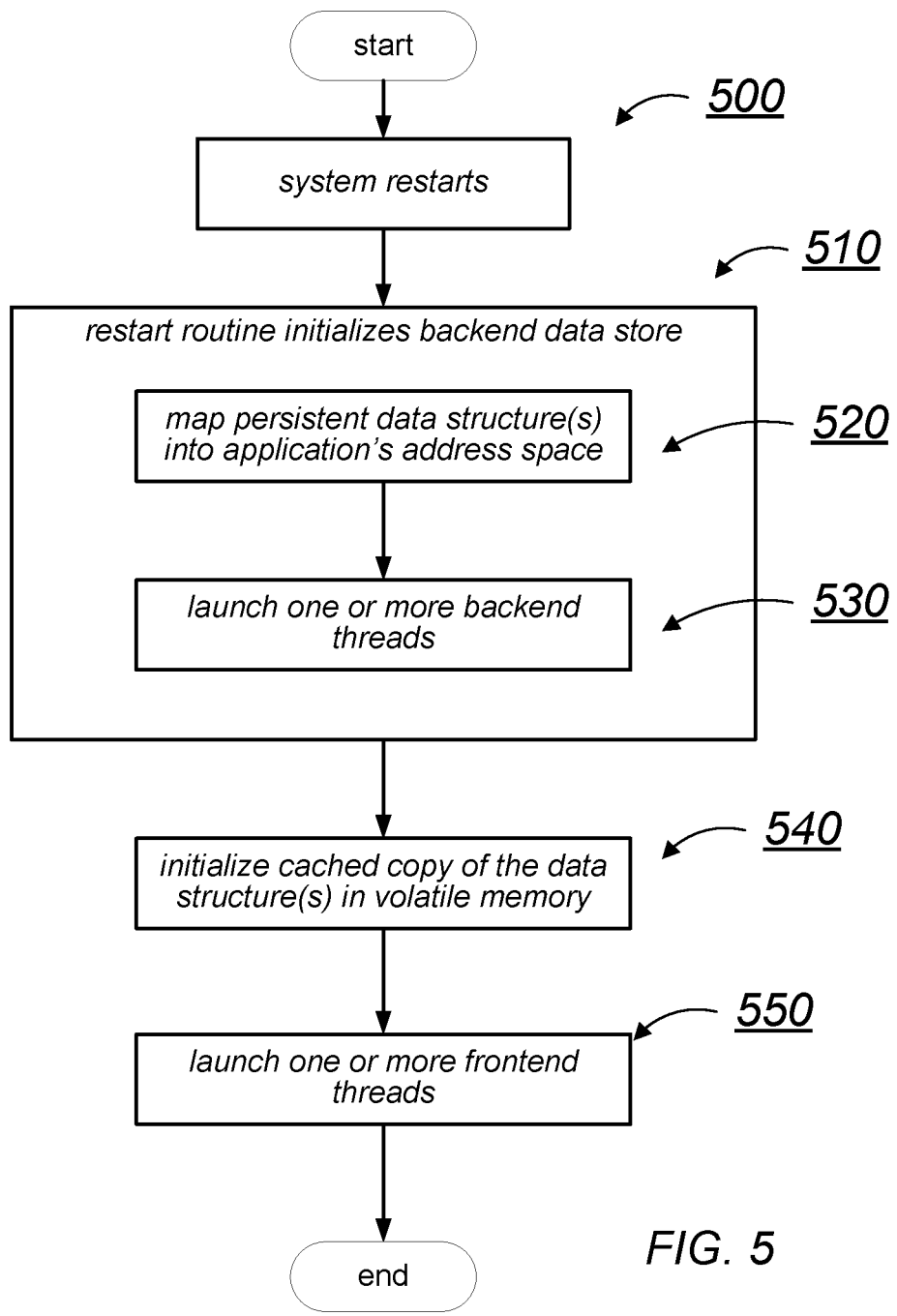
FIG. 5 is a flowchart illustrating one embodiment of a method for restarting a persistent data structure store.

FIG. 5 is a flowchart illustrating one embodiment of method for restarting a persistent data structure store after a system restart, as described herein. In some embodiments, post-failure recovery may comprise two steps: (i) concurrently applying outstanding log records to the backend persistent data structures, and (ii) initializing empty frontend data structures resident in volatile memory (e.g. the hash table). This prepares the system to serve requests from clients. This recovery algorithm may, in some embodiments, complete in the order of a few milliseconds, even for extremely large data sets. Thereafter the cache copy of the structure(s) may be incrementally populated as requests are fetched from the backend persistent copy of the data structure(s).

When the system restarts (e.g., such as after an orderly shutdown or failure) as in block 500, a restart routine of the persistent data store system may first initialize the backend data store as illustrated by block 510. In one embodiment, the restart routine may initialize the backend data store in two steps. For example, the restart routine may map the persistent data structure(s) into the application's address space, as in block 520. For instance, in one example embodiments, a restart routine may mmap the file including its persistent data structure(s) in the application's address space, such as to allow the frontend and the backend to utilize similar addressing. Additionally, as in block 530, the restart routine may launch one or more backend threads which may be configured to apply (e.g., asynchronously) the entries of the persistent log to the backend data store. Subsequently, the system (e.g., the restart routine or another process) may initialize a cached copied of the data structure(s) in volatile memory as in block 540 and may also launch one or more backend threads as in block 550. For example, in one embodiment, the system may instantiate an empty frontend data store in the volatile domain (e.g., in DRAM) and launch one or more frontend threads. The system may then be ready to process client requests.

According to various embodiments, a persistent data structure store as described herein may include any of various features, such as implementations of a K-V store (in both the non-persistent volatile domain and the persistent domain), a parallel logging scheme, coordination between frontend and backend threads regarding log entries, failure atomicity guarantees of update operations, etc., as discussed in more detail below.

Hash Tables

Figure 6:
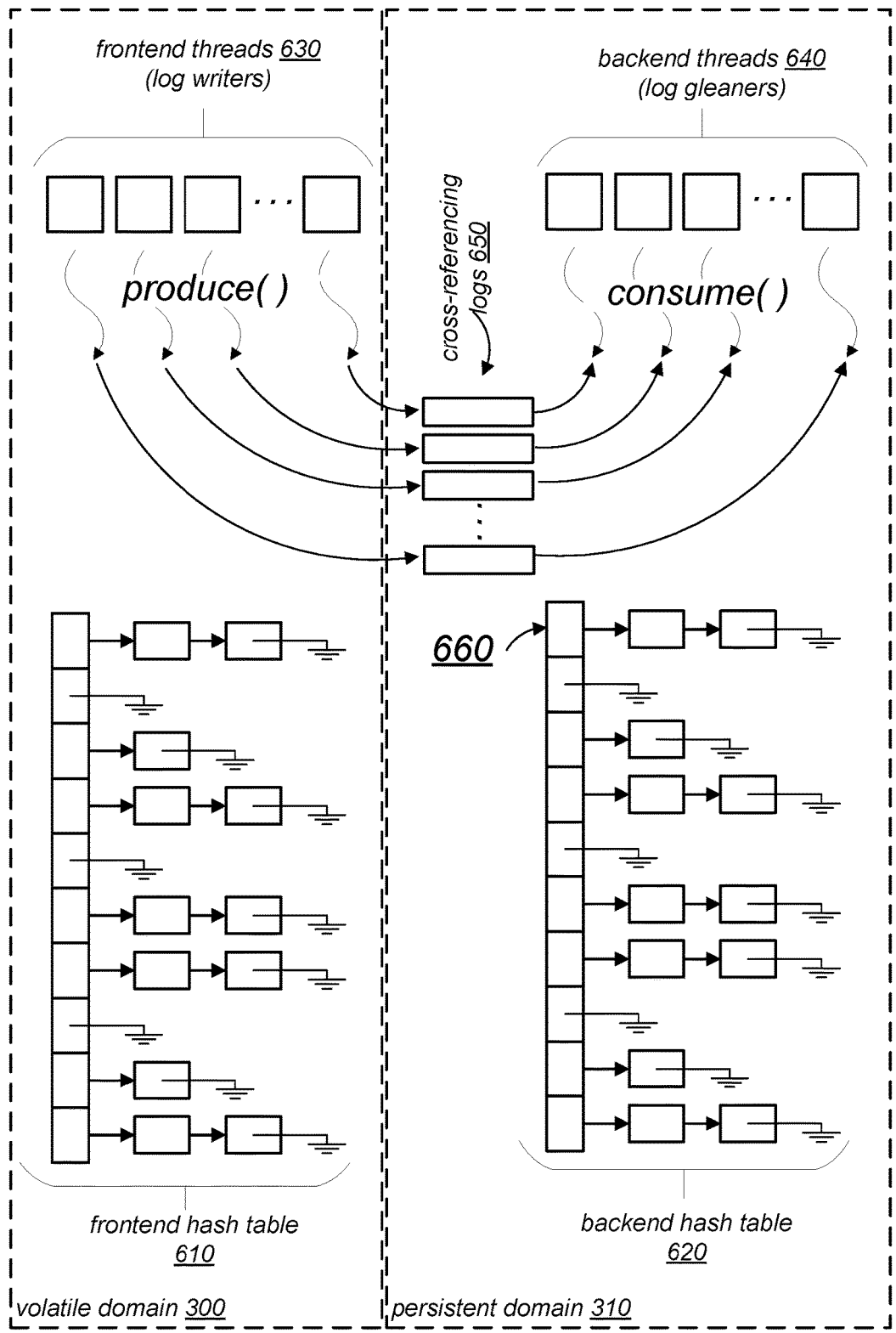
FIG. 6 is a logical block diagram illustrating an example detailed architecture of a persistent data structure store system, according to one embodiment.

FIG. 6 depicts one example architecture for a persistent data structure store as described herein. In some embodiments, both the frontend data store and the backend data store may represent or host hash tables, such as frontend hash table 610 and backend hash table 620. In some embodiments, the frontend hash table 610 is non-persistent and may resides in volatile domain 300 (e.g., in DRAM). Additionally, the frontend hash table 610 may have its own accessor functions to access the data in the cached copy of the data structures. For example, in one embodiment frontend hash table 610 may have its own accessor functions to GET, PUT, and REMOVE key-value pairs from a key-value structured hash table. In some embodiments, the frontend hash table may be similar in structure to the frontend data store. For instance, in an embodiment implementing a key-value based data store, the frontend hash table may also include, or be formatted similar to, a key-value data structure.

In general, any of various hash table feature, functions, techniques and/or mechanisms may be utilized with the hash tables (e.g., the frontend and backend hash tables), according to various embodiments. For example, a hash table may be closed addressed, with chaining used to handle hash conflicts between different keys, according to one example embodiment. A hash table may also be growable in some embodiments, such as with a background thread responsible for increasing (e.g., doubling) the number of hash table buckets if occupancy reaches a threshold size. Furthermore, threads, such as frontend threads 630 or backend threads 640, may concurrently perform operations on the hash table as it grows in some embodiments. Each hash table bucket 660 may be protected by a reader-writer spinlock and in some embodiments, lookups may lock the spinlock. In other embodiments, the hash table may utilize optimistic lookups instead of, or in addition to, locking.

As illustrated in FIG. 6, the backend hash table 620 may be structurally similar (or identical or almost identical) to the frontend hash table 610. For instance, in one embodiment both the frontend hash table and the backend hash table may have their own per-bucket overflow chains and/or spinlocks. Additionally, in some embodiments, both the hash tables (e.g., frontend hash table 610 and backend hash table 620) may utilize optimistic lookups instead of, or in addition to, locking. Additionally, in some embodiments, both frontend hash table 610 and backend hash table 620 may utilize similar (or identical) lookup operations to access data within the hash tables.

However, while frontend volatile hash table 610 may reside in volatile domain 300 (e.g., in volatile memory), backend hash table 620 may be hosted in persistent domain 310 (e.g., in persistent memory) and thus may be expected to survive failures, according to some embodiments. Additionally, failure atomicity of update operations (e.g. PUT, REMOVE, push<list>, pop<list>, etc.) may be guaranteed in some embodiments to ensure survival across failures and/or restarts.

In some embodiments, the spinlocks per bucket in the persistent backend hash table 620 may be used for synchronization between concurrent threads and may be semantically non-persistent. However, when the spin-lock resides in persistent memory, its state may persist at arbitrary times (e.g. due to cache line evictions). Thus, in some embodiments, the locked state of the spinlock may survive restarts, such as due to a failure occurring while the spinlock's locked state has persisted. Therefore, in some embodiments, spinlocks may be reinitialized to their unlocked state on restart. However, reinitializing the spinlocks may be performed lazily when the spin-lock is being locked for the first time by a thread. To detect the need for reinitialization, spinlocks may be tagged with a persistent generation number that may represent a global generation number, according to some embodiments. A global generation number may be incremented (and persisted) during the warmup/restart procedure. Additionally, locking a spinlock may also include stashing/storing the current generation number in the spinlock.

Cross-Referencing Logs

Write-ahead logging may be considered a prevalent technique used by databases and storage systems to quickly persist updates on traditional slow, block-based storage media. Even when utilizing faster byte-addressable persistent memory technologies, write-ahead logging may be used, such as due to overheads associated with failure atomicity semantics and potentially higher (e.g., higher than DRAM) latencies of persistent memory technologies. However, the byte-addressability of some persistent memory implementations, combined with sequential and random write latencies (e.g., comparable to those with non-persistent DRAM), may be utilized with concurrent logging schemes. Such concurrent logging schemes may, in some embodiments, scale better than approaches that are largely centralized and non-scalable. In some embodiments, a persistent data structure store as described here may include one or more cross-referencing logs 650. In some embodiments, a cross-referencing log may be implemented using a logging algorithm that leverages cache coherence (e.g., such as on modern multicore systems) to provide a potentially highly scalable concurrent structure. In some embodiments, a cross-referencing log system may provide a scalable concurrent structure without relying on centralized clocks (e.g., such as to enforce a total order between updates to the same data).

Each frontend thread 630, which may be referred to as a log writer, may maintain its own persistent cross-referencing log 650, appending log records indicating data operations to be applied (by backend threads) to the persistent copy of the data store (e.g., to backend hash table 620 in one example embodiment). In some embodiments, no synchronization may be necessary to append new log records, such as due to there being a single writer, such as frontend thread 630, for each cross-referencing log 650. The backend may also include one or more backend threads 640, which may be referred to as log gleaners, that may consume the log records from cross-referencing logs 650 and apply them to the persistent backend hash table 620. In some embodiments, backend threads 640 may apply log records to the backend hash table 620 in a failure-atomic manner.

Figure 7:
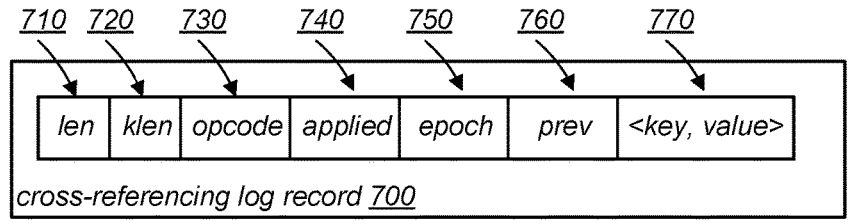
FIG. 7 is a logical block diagram illustrating a high-level view of a cross-referencing log record, according to one example embodiment.

FIG. 7 shows a high-level view of a cross-referencing log record, according to one example embodiment. Logically, each log record 700 may store, specify and/or indicate a data operation that needs to be applied to the persistent copy of the data structure(s). For instance, according to one example embodiment, each log record 700 may indicate and/or include an <opcode,payload> tuple 730/770 to be applied to the backend hash table 620. In addition, log records 700 may include any of various other information, such as length value 710, k length value 720, applied flag 740, epoch number 750 and/or prev pointer 760, according to various embodiments.

Figure 8:
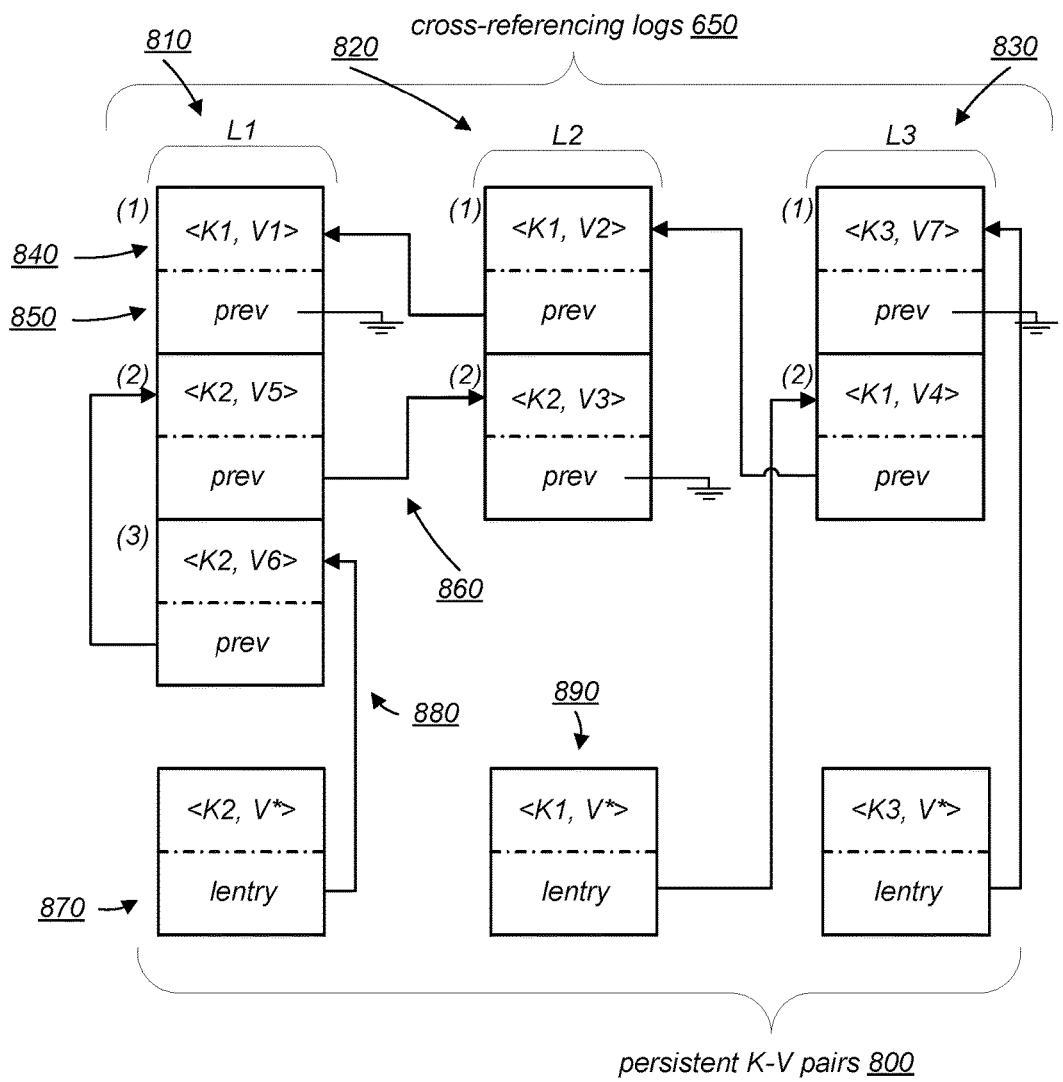
FIG. 8 is a logical block diagram illustrating one example embodiment of cross-referencing logs.

Appending Log Records: FIG. 8 is a logical block diagram illustrating one example embodiment of cross-referencing logs. FIG. 8 shows 3 example cross referencing logs—L1 810, L2 820, and L3 830 that include log records for keys K1, K2, and K3, according to one example embodiment implementing a persistent data structure store based on key-value pairs. Thus, the cross-referencing logs 650 store log entries related to data operations (e.g., updates, insertions, etc.) for the persistent key-value pairs 800. Log L1 810 includes three entries, while log L2 820 and log L3 830 each include two entries. Each log entry illustrated in FIG. 8 includes two fields, a key-value pair 840 and a prev pointer 850. While the log entries illustrated in this example embodiment only include two fields, in other embodiments, log entries may include additional information, as described above regarding FIG. 7.

The arrows, such as arrow 860, between log records (e.g., from a prev pointer in one log entry to another log entry) represent back pointers to previous log records for the same key. The persistent key-value pairs 800 include an lentry field 870 including a persistent pointer, represented by arrow 880, to the particular log record that includes the latest update directed to the corresponding key-value pair. Thus, the list created by transitively traversing the prev pointers (e.g., starting at the lentry field 870) in the log records may include the updates directed to the key-value pair in reverse chronological order. A log record with prev assigned to NULL, such as prev pointer 850, may indicate that the record is the first update to the corresponding key-value pair in the cross-referencing logs.

The log appends are performed by log writer threads. In some embodiments, there may be a one-to-one correspondence between logs and log writers, as noted above. When adding entries to the cross-referencing logs, a frontend thread 630 adds the entry to its own particular log without regard to which data is being targeted by the data operations represented by the log entry, according to some embodiments. For instance, in the key-value pair example, log L2 includes log entries targeting both key K1 and key K2. Similarly, logs L1 and L3 also include log entries targeting different keys. Thus, the log records for a given key can form a singly-linked list that criss-crosses between multiple logs. For instance, in the example embodiment, log records for key K1, linked by prev pointers, appear in all 3 logs, whereas log records for key K2 appear in logs L1 and L2. However, in some embodiments, before an append happens the log writer thread may need to ensure that it is the only writer for the target key-value pair. In some embodiments, it may do so by locking a spinlock associated with the key-value pair. In general, spinlocks may be utilized regardless of the type, format or structure of the data being used. Thus, while described herein regarding key-value pairs, spinlocks may be utilized with other data structures, according to various embodiments. Thereafter, the log append operation may populate and persist the log record at the tail end of the log, and may then update and persist the log's tail index, according to one example embodiment. Additionally, the persistent key-value pair's lentry pointer 870 may be updated to point to the just appended log record.

Applying Log Records: Backend log gleaner threads 640 may distribute logs amongst themselves and periodically scan and apply the data operations indicated in log records/entries to the persistent copy of the data structure, such as to backend hash table 620. In some embodiments, backend threads 640 may apply the data operations specified in log records/entries in a failure-atomic manner. Furthermore, backend threads 640 may ensure that each log record is applied only once. In some embodiments, this requirement may be relaxed for idempotent writes, however the overhead of one-time only application may not be significant enough to motivate the relaxation. The prev pointers 850 in log records may be used to allow data operations from log records to be applied in a correct (e.g., chronological) order.

A log gleaner (e.g., backend thread 640) applying records from a log may begin from the log's head end (i.e. log entries are appended to the tail end of a log). For each log record encountered, the gleaner may look up the corresponding (e.g., the targeted) data value in the persistent copy of the data structure. For instance, in the key-value pair example, when applying a log entry, a backend thread 640 may look up the corresponding key-value pair 840 in the persistent backend hash table 620. As described earlier, in some embodiments the targeted data value, such as the key-value pair in one example, may include a non-persistent spinlock. The gleaner may lock this spinlock and then dereference the lentry pointer 870 to get access to the key-value pair's list of log records. In some embodiments, the gleaner thread may then peruse to the end of the list (e.g., to the oldest entry), checking the applied flag 740 of each log record in the process to determine the point from which the gleaner needs to apply the log records in the reverse order of the perusal.

Once the last (chronologically the first) unapplied log record is found, the gleaner may apply the log records in the chronological order determined by the linked list. As each log record is applied to the persistent copy of the data structure (e.g., the backend hash table 620 in one example), its applied field 740 may be updated/set. In some embodiments, this log record application may be performed in a failure-atomic manner as described subsequently.

As an example, in FIG. 8, a gleaner for log L1 810 may first encounter log record labeled (1) (including fields 840 and 850). It may then use the log record's key, K1, from field 840, to retrieve the corresponding persistent key-value pair 890. From that key-value pair object, the gleaner may walk up the log records list L3(2)-L2(1)-L1(1) and apply those log records to the key-value pair in the reverse order of traversal (e.g., in chronological order), according to one example embodiment. This process may criss-cross between different logs for key-value pairs that are updated by multiple log writers—hence the name Cross-Referencing logs. The appending and applying log records is described herein mainly in terms of key-value pairs according to one example embodiment, however the features, functions, techniques, method and/or mechanisms described herein may also be applied to other data structures and/or other data formats according to various embodiments.

While the criss-crossing that occurs when utilizing cross-referencing logs may possibly lead to poor cache locality of log gleaner threads, cross-referencing logs may provide two significant benefits, according to various embodiments. First, although the locality of log record accesses may be disrupted due to the criss-crossing nature of log perusals, the corresponding data (e.g., key-value pair) that is updated by the single gleaner thread remains the same, and hence may enjoy the benefits of cache hits for the persistent data value (e.g., key-value pair) itself. This benefit may be further enhanced because while log records may be concise representations of operations, the operations themselves may lead to write "multiplication" in terms of many more memory locations being updated (e.g. the backend hash table, the key-value pair's data structure) and those additional accesses may be far more likely to end up as cache hits when using cross-referencing logs, according to some embodiments. Second, a gleaner may never be blocked behind another gleaner. For example, while scanning a log record, if a gleaner detects that the corresponding data's (e.g., key-value pair's) spinlock is locked by another gleaner, it may safely assume that the spinlock owner will apply the log record. As a result, the gleaner may skip that log record. This approach may be used in conjunction with a fail-stop failure model (i.e., a failure terminates the entire key-value store process) in some embodiments. Additionally, in some embodiments the gleaners work in the backend and as long as they keep up with the mutation rate (e.g., append rate) of frontend threads, their individual performance may have a large effect on overall system performance.

Log Space Reclamation

In some embodiments, cross-referencing logs 650 may act as, and/or be considered, bridges between frontend and backend data stores 340 and 350. Additionally, in some embodiments, cross-referencing logs may not be allowed to grow indefinitely. In one embodiment, cross-referencing logs 650 may be implemented as circular logs and include persistent head and tail indexes/pointers. Thus, at some point the memory used by these logs may need to be recycled for new log appends. In some embodiments, an epoch-based scheme is used to manage and reclaim space occupied by the logs. Each log record may include a monotonically increasing epoch number 750. Additionally, a global epoch counter may indicate the current active epoch number and in some embodiments, the global epoch's value may be written into the appended log record (e.g., in the epoch 750 field) by the log writer.

In some embodiments, the log gleaners may work in phases (e.g., periodically). For example, in the beginning, the gleaners may be in a sleep state. A phase may begin when the gleaners are woken up (e.g., periodically) to apply log records to the persistent copy of the data structure (e.g., backend hash table 620). The wake-up procedure may increment (and may persist) the global epoch number. All subsequent log appends done by writers may then write the new global epoch number to the appended log entries epoch field 750. Meanwhile, log gleaners may start perusing logs from their head indexes and may apply only those log records that include the previous epoch numbers. In other words, a gleaner thread may only apply log records whose epoch field 750 has a value less than the current value of the global epoch number. A gleaner may reach the tail end of the log in the process, in which case the gleaner will leave the log logically empty when it is done. The reclaimed log records may then be reused for new log records by the log writers.

In some embodiments, a finite set of log records may be available for use in cross-referencing logs 650, either individually for each log or collectively for all logs. If a log writer proceeds faster than a corresponding log gleaner, the log may fill up. Thereafter the log writer may, in some embodiments, block while waiting for the gleaner to reclaim log records. Note that though log records may be applied one at a time, they may be reclaimed en mass (i.e., at epoch granularity) by the log gleaner. For example, this may be done by updating (and persisting) the head index of a log according to some embodiments.

Alternate Logging Strategies

The system described herein may be implemented using various approaches to log management according to various embodiments. For instance, in one embodiments, a variant of cross-referencing logs may be utilized that consumes log records in a different way. Following the key-value pair example, instead of criss-crossing between logs for a given key-value pair K, a log gleaner may stall, waiting for the previous log record for K to be applied by another gleaner (i.e., because that log record may be guaranteed to reside in a different log being processed by a different gleaner). In some embodiments, this approach may avoid criss-crossing between logs that might disrupt cache locality of the gleaner. However, blocking (e.g., stalling) of gleaners may result in a straggler gleaner slowing down the overall log application process, in some embodiments. This blocking approach (i.e., gleaner threads block rather than criss-crossing between logs) may exhibit slightly worse performance than a non-blocking cross-referencing logs approach, according to various embodiments. Furthermore, utilizing blocking gleaners (e.g., blocking rather than criss-crossing logs) may require the total number of log gleaner threads 640 to be equal to the number of logs 650, which may be unnecessary for read dominated workloads, according to some embodiments.

Another example alternative approach to log management may involve a partitioned data store. For instance, continuing the key-value pair example embodiment, the key space may be partitioned using a random hash distribution between P partitions of the frontend K-V store, while all the partitions may be hosted on the same server. Additionally, a single frontend thread may be assigned to each partition. As a result, the frontend threads may not require (nor engage in)

any synchronization to access their respective partitions. Thus, in some embodiments, each frontend thread 630 may have a private cross-referencing log 650. The backend K-V store may be off the critical path in most cases, and therefore may not be partitioned in some embodiments. Partitioning of the frontend K-V store may, in some embodiments, guarantee that log records for each key-value pair belong to only one log. As a result, there may be no need for enforcing cross-log ordering dependencies, which may lead to performance improvements in some embodiments. However, in other embodiments, utilizing a partitioning key-value store may lead to load balancing issues. Thus, in some embodiments, both partitioned data stores and one or more load balancing mechanisms may be utilized together.

Failure Atomic Transactions

As stated previously, to tolerate failures at arbitrary times, updates to the backend store's data structure (e.g. the backend hash table, various value type instances, etc.) may need to be failure atomic. Thus, in some embodiments, failure atomic persistent memory transactions may be used. In some embodiments, a system implementing a persistent data structure store 160, as described herein, may include a persistent memory access library 170 configured to provide support for lower level programming abstractions allowing program applications directly to persistent memory. For example, in some embodiments access library 170 may include support for a transaction abstraction enforcing failure atomicity guarantees for the updates done within the transaction.

The access library 170, which may be referred to as an access runtime, may present a simple programming interface as shown in the example API below:

```
pm_txn_t *txn_begin ( );
txn_state_t txn_commit (txn);
void txn_read (txn, src, len, dst);
void txn_write (txn, dst, len, src);
... // other accessor functions
pm_region_t *pm_region_open (path);
void_pm region_close (region;
... // other region management functions
void *pm_alloc (txn, len);
void pm_free (txn, addr);
```

As shown in the example API above, one embodiment of a transaction abstraction may include txn_begin and txn_commit functions configured to delineate transaction boundaries, as well as various flavors of txn_unread and txn_write accessor functions configured to implement transactional reads and writes of persistent data. The access library's interface may also provide transactional variants of general purpose libc macros, such as memcpy, memset, memcmp, etc. Additionally, in some embodiments, "flat nesting" semantics for transactions may be provided. Transactions may provide failure atomicity semantics for updates performed within the transaction without transparently managing concurrency control. In some embodiments, a computer system 100 implementing a persistent data structure store 160, as described herein, may perform synchronization, such as to avoid data races and deadlocks in the application.

Additionally, in some embodiments, the transaction interface of access library 170 may be flexible so as to enable various implementations of transactional writes, such as undo logging, redo logging, or copy-on-write, etc. In general, virtually any form/implementation of transactional writes may be utilized with access library 170 and persistent data structure store 160, according to various embodiments. Moreover, some implementations of transactional writes may perform better than others in various embodiments (e.g., redo logging may perform better than undo logging or copy-on-write).

In some embodiments, an access library 170 may also include a persistent region abstraction 180. For instance, in one embodiment the persistent region may build over an mmap interface configured to map a persistent memory file in the application's address space, such as MMU mappings 247. As one possible example, according to one embodiment, the persistent region abstraction 180 may include a persistent heap modeled after the Hoard allocator implemented by Volos et al. for persistent memory.

Recovery and Warmup

In some embodiments, recovery may involve first completing all in-flight transactions. For instance, updates may be rolled back if the transaction did not complete, or the updates may be applied if the transaction logically committed but its updates were not applied physically before the failure. Thereafter, the backend threads 640 may be launched and may peruse through their respective cross-referencing logs 650 and apply the log records to the backend data store in the manner described above, according to various embodiments.

During warmup, references to the persistent domain 310's data structures (e.g., the backend hash table 620 and/or cross-referencing logs 650) may be retrieved and an empty frontend hash table may be created, as described above regarding FIG. 5. Thereafter, the frontend threads 630 may be launched and the network subsystem may be initialized to start receiving requests from clients, according to some embodiments. At this point, the system may be ready to process new client requests. In some embodiments, it can take (only) a few milliseconds for this whole recovery and warmup procedure to complete. In general, the recovery time may be proportional to the time taken to apply the entries from the cross-referencing logs 650.

Traditional approaches generally require a high latency warmup procedure that includes formatting and loading all the persistent state of the key-value store into DRAM, which generally takes time linearly proportional to the size of the data set. In contrast, a system configured to implement a persistent data structure store as described herein may host its persistent state in a byte-addressable form, which may enable it to quickly service client requests from the persistent copy of the data structure (e.g., the persistent representation in its backend K-V store in the key-value pair example), according to some embodiments. In practice, the frontend data store may be warmed up lazily as client requests are received. For instance, continuing the key-value pair example, a requested key-value pair may be retrieved from the backend K-V store, replicated in the frontend K-V store, and the client request serviced from the frontend K-V store (e.g., using the replicated version of the key-value pair). This lazy warmup may, in some embodiments, increase the latency of early client requests, however it may provide a reasonable performance tradeoff for a fast(er) warmup.

Value Types

In some embodiments, when utilizing key-value pairs a persistent data structure store 160 may include various value types, such as strings, linked lists, etc. For instance, as with hash tables, two versions of the value types may be maintained—a volatile cached copy (e.g., a version in DRAM) and a persistent copy in persistent memory (e.g., in the backend persistent hash table). In some embodiments, each value type instance may be protected by a corresponding key-value specific spinlock and value type operations (e.g. push<list>, pop<list>) may lock the corresponding spinlock during execution. The cached version of these operations may be thread safe code that manipulates the cached data structure instance. Additionally, the backend version of these operations may need to guarantee failure atomicity (e.g., using transactions). Furthermore, some operations may not be idempotent and therefore the backend may also need to ensure that each operation is applied only once, as described above.

Implementation

In one example embodiment, a system configured to implement a persistent data structure store 160 as described herein may be implemented in C++ and may utilize an access library 170 which may be independently developed (e.g., in C). Additionally, in one example embodiment, a pthread package may be used to implement both the frontend threads 630 and backend threads 640. Additionally, frontend threads 630 may each use a distinct TCP socket to receive/send client requests/responses respectively. In some embodiments, the TCP stack may lead to latency overheads, however these may be overcome using modern network stacks, such as those including direct use of RDMA primitives. In general, any of various communication techniques may be used to send/receive client requests/responses when implementing a persistent data structure store 160, as described herein.

In the example embodiment described above, the frontend K-V store 340 may use a traditional libc malloc library to handle memory allocations. If required (or desired), more scalable allocators such as Hoard™, may be utilized in some embodiments. For the backend, the access library 170's heap manager may be used, which in some embodiments, may also be based on the scalable Hoard allocator.

The system's backend may, in some embodiments, be layered on the access library 170. As described above, the access library 170 may present a mmap'ed file as a persistent region. The persistent domain 310 may, in some embodiments, be precisely that persistent region. In some embodiments, the persistent domain 310 may "move around" every time it is freshly mapped (e.g. after each restart), due to the mmap dependency. Representing persistent pointers to persistent objects may become challenging since the virtual address may change if the persistent domain 310 moves. Thus, in some embodiments, a based pointers technique may be employed to represent persistent pointers. For instance, the base address used for dereferencing these pointers may be the base address of the persistent domain mapped in the address space. In general, any of various memory mapping and accessing techniques/mechanisms may be used by a persistent data structure store 160, as described herein according to various embodiments.

Additionally, in some embodiments the backend data store may include a root structure configured to host persistent pointers to all the pertinent data structures hosted in the persistent domain 310 (e.g., backend hash table 620, cross-referencing logs 650, etc.). In general, wherever persistent transactions are not used, stores and/or persists to persistent data structures (e.g. initializing a newly allocated key-value pair, or list node allocated in push<list>) may need to be carefully ordered.

All update operations performed by backend threads 640 may, in some embodiments, utilize transactions to apply records from the cross-referencing logs 650 records to the backend copy of the data structure(s). In addition to applying the operation indicated in a log record, the transaction may also set/update the log record's applied field 740 to indicate that the log record has been applied. In contrast, the frontend updates (e.g., applying operations to the cached copy of the data structure) may not require transactions, according to some embodiments. Thus, in some embodiments, dual implementations of operations (e.g. frontend and backend implementations of PUT, REMOVE, etc. operations) may be utilized.

However, in some embodiments the frontend threads 630 may use transactions for cross-referencing log appends (e.g., due to decoupling the persistent key-value pair from the log record). Continuing the key-value pair example, the log record may point to the key-value pair it affects. Thus, for a PUT operation, if the key-value pair does not exist in the backend hash table, a new pair must be allocated from the persistent heap, in some embodiments. After allocation, the key-value pair may be initialized and a reference to it may be stored in a corresponding log record subsequently appended by the frontend thread 630. These steps may be included within a transaction, such as to avoid memory leaks because of failures (i.e., if there was a failure right after the key-value pair is allocated, persistent references to it may be lost, potentially leading to a memory leak). Since transactions may incur significant bookkeeping overheads, log append operations may be organized to minimize work done within a transaction. For example, in one embodiment a log append transaction may include: allocating and initializing a key-value pair, storing a reference to the key-value pair in the already populated log record, and then update the log index to complete the append. In some embodiments, the transaction may be optimized out, such as by inlining the new key-value pair within the log record itself.

Evaluation

Preliminary experimentation of the persistent data structure store's performance, according to one example embodiment, was performed on Intel's Software Emulation Platform. This emulator hosts a dual socket 16-core processor, with 512 GB of DRAM. 384 GB of that DRAM is configured as "persistent memory" and 128 GB acts as regular memory. In this example embodiment, persistent memory is accessible to applications via mmapping files hosted in the PMFS instance installed in the emulator.

For this example embodiment, the access library was built using the lower level persistence primitives. For instance, Intel has proposed clflushopt, pcommit for persistent memory and the emulator used with this example embodiment supports the clflushopt and pcommit instructions. According to this example embodiment, pcommit's latency, as well as the latency for load instructions directed to the persistent memory, is configurable.

Figure 9:
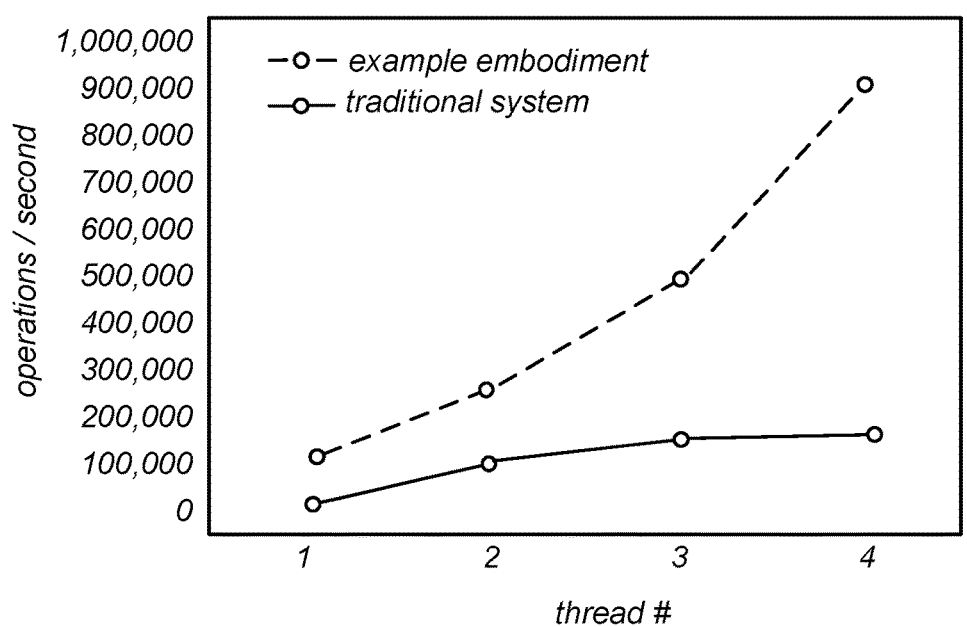
FIG. 9 is an illustration of one example comparison of a persistent data structure store system to an off-the-shelf system, according to one embodiment.

FIG. 9 compares the performance of the example embodiment with that of an off-the-shelf system (e.g., Redis) that persists its data on a file resident in the PMFS instance on the emulator. In the example comparison of throughputs illustrated in the figure, each utilized core serves one connected client, who issues 1 million operations according to a specified 90%-10% GET-PUT ratio. The keys are randomly drawn from a space of 238,328 keys, and the K-V store is pre-populated by 1 million random PUTs. Averages of 3 consecutive runs are reported. Error bars are omitted because of low variabilities in these benchmarks. For this experiment, the latency of load instructions to persistent memory was configured to 300 nanoseconds. The latency of the pcommit instruction was configured to 100 nanoseconds, emulating the behavior of a system with Asynchronous DRAM Refresh (ADR), which ensures that all memory controller buffers are flushed out to the DIMMs during a power-failure event. Please note that the comparison described herein represents merely one possible example embodiment of a system configured to implement a persistent data structure store as described herein and that other embodiments may differ greatly from that described herein regarding this example evaluation comparison.

The example embodiment clearly beats the off-the-shelf system across the board. While the comparison is not entirely "apples-to-apples" since the off-the-shelf system also maintains an LRU cache infrastructure for the data, it is believed that infrastructure, once incorporated in the persistent data structure store described herein may not significantly change overall performance trends. On single thread runs, the example embodiment obtained 2× the throughput of the off-the-shelf system. This difference increases substantially the thread count increases (8× for 8 threads) because the example embodiment is a scalable implementation while the off-the-shelf system is a single threaded system. The little improvement in scaling of the off-the-shelf system from 1 to 4 threads is because of the pipelined parallelism between requests and responses going through the TCP stack between the clients and the off-the-shelf system instance, and the single threaded execution of the off-the-shelf system.

The example embodiment used in the comparison exhibited a warmup time that linearly increases with the footprint of the data set. A further investigation revealed that the warmup interval can be broken down into two parts: (i) the access library's heap reinitialization, which in the example comparison is linearly proportional to the heap size, and (ii) application of the cross-referencing logs, which in the example comparison is proportional to the log sizes, which are in turn proportional to epoch intervals. Using an example epoch interval is 1 millisecond, the application recovery part itself is approximately 1 millisecond. Little difference was observed in this time for larger data sets (e.g. 15 million key-value pairs). Persistent heap reinitialization includes reinitialization of all the (e.g., Hoard) superblocks hosted within the heap. This in turn may requires a linear walk-through of the heap. While this may be done eagerly in some embodiments, in other embodiments this warmup overhead may be alleviated by initializing individual superblocks lazily when they are used the first time. Additionally, in some embodiments, this optimization may eliminate some (or most) of the heap reinitialization work during warmup. Note that despite a linear warmup overhead, a system implementing a persistent data structure store as described herein may still be an order of magnitude (10×) faster than the warmup phase of an off-the-shelf system, as exhibited by the example comparison described above.

Example Computing System

Figure 10:
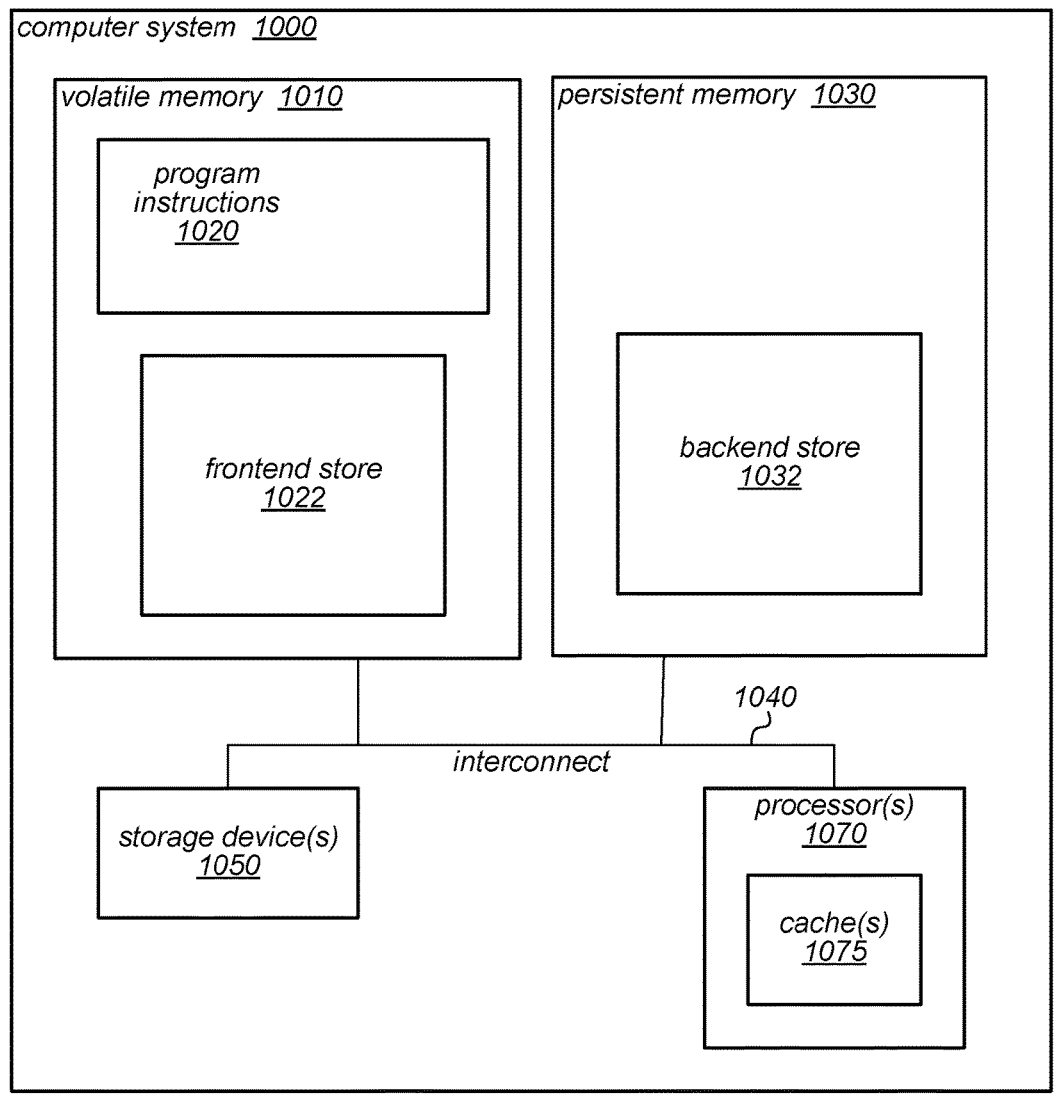
FIG. 10 is a logical block diagram illustrating one example of a system configured to implement a persistent data structure store system as described herein according to one embodiment.

The techniques and methods described herein for a persistent data structure store may be implemented on or by any of a variety of computing systems, in different embodiments. For example, FIG. 10 is a block diagram illustrating one embodiment of a computing system that is configured to implement such techniques and methods, as described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

Some of the mechanisms for a persistent data structure store, as described herein, may be provided as a computer program product, or software, that may include a non-transitory, computer-readable storage medium having stored thereon instructions, which may be used to program a computer system 1000 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single- or multi-threaded. For example, multiple processor cores may be included in a single processor chip (e.g., a single processor 1070), and multiple processor chips may be included in computer system 1000. Each of the processors 1070 may include a cache or a hierarchy of caches 1075, in various embodiments. For example, each processor chip 1070 may include multiple L1 caches (e.g., one per processor core) and one or more other caches (which may be shared by the processor cores on a single processor). The computer system 800 may also include one or more storage devices 1050 (e.g. optical storage, magnetic storage, hard drive, tape drive, solid state memory, etc.) and one or more system memories, such as volatile 810 (e.g., one or more of cache, SRAM, DRAM, RDRAM, EDO RAM, DDR 10 RAM, SDRAM, Rambus RAM, EEPROM, etc.) and persistent memory 1030 (MRAM, STT-MRAM, persistent memory DIMM, etc.). In some embodiments, one or more of the storage device(s) 1050 may be implemented as a module on a memory bus (e.g., on interconnect 1040) that is similar in form and/or function to a single in-line memory module (SIMM) or to a dual in-line memory module (DIMM). Various embodiments may include fewer or additional components not illustrated in FIG. 10 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory, such as volatile memory 1010 may be coupled to the system interconnect 1040. Volatile memory 1010 may include a frontend store 1022, while persistent memory 1030 may include a backend store 1032. One or more of the system memories 1010 may include program instructions 1020. Program instructions 1020 may be executable to one or more of the features, modules, applications, etc., described herein regarding a persistent data structure store. Program instructions 820 may be encoded in any of various languages, such as platform native binary, C/C++, etc., or in a combination of languages.

Although the embodiments above have been described in considerable detail, numerous variations and modifications will become apparent to those skilled in the art once the above disclosure is fully appreciated. For example, although many of the embodiments are described in terms of particular types of operations that support synchronization within multi-threaded applications that access particular shared resources, it should be noted that the techniques and mechanisms disclosed herein for accessing and/or operating on shared resources may be applicable in other contexts in which applications access and/or operate on different types of shared resources than those described in the examples herein and in which different embodiments of the underlying hardware that supports persistent memory transactions described herein are supported or implemented. It is intended that the following claims be interpreted to embrace all such variations and modifications.

What is claimed:

1. A method, comprising:
performing by one or more computing devices:
maintaining, in a non-volatile persistent memory of the computing devices, an in-memory, byte-addressable, persistent copy of a data structure comprising one or more data values;
maintaining, in a volatile memory of the computing devices, a copy of at least one data value of the one or more data values of the data structure in a cache copy of the data structure; and
maintaining, in the non-volatile persistent memory, a data operations log configured to store log entries indicating data operations applied to respective data values in the cache copy of the data structure and further indicating whether a respective data operation has been applied to the persistent copy of the data structure.

2. The method of claim 1, further comprising:
receiving, from a client process executing on the one or more computing devices, a data read request targeting a data value of the data structure;
in response to determining that a copy of the targeted data value is not present in the cache copy of the data structure in volatile memory, adding a copy of the targeted data value to the cache copy of the data structure from the persistent copy of the data structure; and
completing the data read request using the added copy of the targeted data value in the cache copy of the data structure in volatile memory.

3. The method of claim 1, further comprising:
receiving, from a client executing on the computing devices, a data write request targeting one of the data values;
completing the data write request using a copy of the targeted data value in the cache copy of the data structure in volatile memory; and
adding, to the data operation log maintained in the non-volatile persistent memory, a log record, wherein the added log record indicates the data write request and the targeted data value.

4. The method of claim 3, further comprising:
applying, based on the added log record, the data operation to the persistent copy of data structure; and
indicating, in the added log record, that the data operation was applied to the persistent copy of data structure.

5. The method of claim 3, wherein the data operations log is one of a plurality of cross-referencing logs configured to store log entries, wherein the added log entry indicates a data operation applied to a respective data value in the cache copy of the data structure and further indicates that the data operation needs to be applied to a persistent copy of a data structure.

6. The method of claim 1, further comprising performing, in response to a shutdown or failure of the computing devices, a restart routine, comprising:
applying data operations specified by one or more outstanding log records of the data operations log to the persistent copy of the data structure, wherein the one or more outstanding log records indicate one or more data operations that have been applied to the cache copy of the data structure but that have not been applied to the persistent copy of the data structure; and
initializing an empty version of the cache copy of the data structure in the volatile memory.

7. The method of claim 6, wherein said applying comprises applying the one or more outstanding log records to the persistent copy of the data structure in a chronological order determined, at least in part on, information comprised within the outstanding log records.

8. The method of claim 1, wherein said maintaining the copy of the at least one data value comprises maintaining the cache copy of the data structure in a data format that is structurally similar to the persistent copy of the persistent copy of the data structure.

9. A system, comprising:
one or more processors;
a volatile memory coupled to the processors; and
a non-volatile persistent memory coupled to the processors;
wherein the volatile memory comprises program instructions configured to implement a persistent data store configured to:
maintain, in the non-volatile persistent memory, an in-memory, byte-addressable, persistent copy of a data structure comprising one or more data values;
maintain, in the volatile memory, a copy of at least one data value of the one or more data values of the data structure in a cache copy of the data structure; and
maintain, in the non-volatile persistent memory, a data operations log configured to store log entries indicating data operations applied to the respective data values in the cache copy of the data structure and further indicating whether a respective data operation has been applied to the persistent copy of the data structure.

10. The system of claim 9, wherein the persistent data store is further configured to:
receive, from a client process executing on the one or more processors, a data read request targeting a data value of the data structure;
add, in response to determining that a copy of the targeted data value is not present in the cache copy of the data structure in volatile memory, a copy of the targeted data value to the cache copy of the data structure from the persistent copy of the data structure; and
complete the data read request using the added copy of the targeted data value in the cache copy of the data structure in volatile memory.

11. The system of claim 9, wherein the persistent data store is further configured to:
receive, from a client executing on the one or more processors, a data write request targeting one of the data values;
complete the data write request using a copy of the targeted data value in the cache copy of the data structure in volatile memory; and
add, to the data operation log maintained in the non-volatile persistent memory, a log record, wherein the added log record indicates the data write request and the targeted data value.

12. The system of claim 11, wherein the persistent data store is further configured to:

apply, based on the added log record, the data operation to the persistent copy of data structure, wherein the data operation is applied asynchronously with said completing the data write request using the copy of the targeted data value in the cache copy; and indicate, in the added log record, that the data operation was applied to the persistent copy of data structure.

13. The system of claim 11, wherein the data operations log is one of a plurality of cross-referencing logs configured to store log entries, wherein the added log entry indicates a data operation applied to a respective data value in the cache copy of the data structure and further indicates that the data operation needs to be applied to a persistent copy of a data structure.

14. The system of claim 9, wherein the persistent data store is further configured to perform, in response to a shutdown or failure of the computing devices, a restart routine, wherein to perform the restart routine the persistent data store is further configured to:

apply data operations specified by one or more outstanding log records of the data operations log to the persistent copy of the data structure, wherein the one or more outstanding log records indicate one or more data operations that have been applied to the cache copy of the data structure but that have not been applied to the persistent copy of the data structure; and initialize an empty version of the cache copy of the data structure in the volatile memory.

15. The system of claim 14, wherein to apply the data operations, the persistent data store if further configured to apply the one or more outstanding log records to the persistent copy of the data structure in a chronological order determined, at least in part on, information comprised within the outstanding log records.

16. A non-transitory, computer-readable storage medium storing program instructions that when executed on one or more computing devices cause the one or more computing devices to perform:

maintaining, in a non-volatile persistent memory of the computing devices, an in-memory, byte-addressable, persistent copy of a data structure comprising one or more data values;

maintaining, in a volatile memory of the computing devices, a copy of at least one data value of the one or more data values of the data structure in a cache copy of the data structure; and maintaining, in the non-volatile persistent memory, a data operations log configured to store log entries indicating data operations applied to respective data values in the cache copy of the data structure and further indicating whether a respective data operation has been applied to the persistent copy of the data structure.

17. The non-transitory, computer-readable storage medium of claim 16, wherein the program instructions further cause the one or more computing device to perform:

receiving, from a client process executing on the one or more computing devices, a data read request targeting a data value of the data structure;

in response to determining that a copy of the targeted data value is not present in the cache copy of the data structure in volatile memory, adding a copy of the targeted data value to the cache copy of the data structure from the persistent copy of the data structure; and completing the data read request using the added copy of the targeted data value in the cache copy of the data structure in volatile memory.

18. The non-transitory, computer-readable storage medium of claim 16, wherein the program instructions further cause the one or more computing device to perform:

receiving, from a client executing on the computing devices, a data write request targeting one of the data values;

completing the data write request using a copy of the targeted data value in the cache copy of the data structure in volatile memory; and adding, to the data operation log maintained in the non-volatile persistent memory, a log record, wherein the added log record indicates the data write request and the targeted data value.

19. The non-transitory, computer-readable storage medium of claim 18, wherein the program instructions further cause the one or more computing device to perform:

applying, based on the added log record, the data operation to the persistent copy of data structure, wherein the data operation is applied in a failure atomic manner; and indicating, in the added log record, that the data operation was applied to the persistent copy of data structure.

20. The non-transitory, computer-readable storage medium of claim 16, wherein the program instructions further cause the one or more computing device to perform, in response to a shutdown or failure of the computing devices, a restart routine, comprising:

applying data operations specified by one or more outstanding log records of the data operations log to the persistent copy of the data structure, wherein the one or more outstanding log records indicate one or more data operations that have been applied to the cache copy of the data structure but that have not been applied to the persistent copy of the data structure; and initializing an empty version of the cache copy of the data structure in the volatile memory.

* * * * *